(12) United States Patent
Adair

(10) Patent No.: US 7,195,793 B1
(45) Date of Patent: Mar. 27, 2007

(54) METHOD AND APPARATUS FOR MAKING A HAND HELD FOOD PRODUCT

(76) Inventor: Darryl Adair, 90 W. Main St., Suite 4, Morgan Hill, CA (US) 95037-4532

( * ) Notice: Subject to any disclaimer, the term of this patent is extended or adjusted under 35 U.S.C. 154(b) by 512 days.

(21) Appl. No.: 10/346,738

(22) Filed: Jan. 16, 2003

(51) Int. Cl.
*A23G 1/21* (2006.01)

(52) U.S. Cl. .................. 426/279; 426/94; 426/282; 426/283; 426/284; 426/514

(58) Field of Classification Search ............... 426/279, 426/280, 514, 499, 391, 138, 94, 283, 282, 426/284; 99/431, 428, 43
See application file for complete search history.

(56) References Cited

U.S. PATENT DOCUMENTS

| | | | | |
|---|---|---|---|---|
| 1,979,429 A | * | 11/1934 | Wilkes et al. ............... 249/125 |
| 3,379,120 A | * | 4/1968 | Fogle ........................ 425/346 |
| 3,980,009 A | * | 9/1976 | Petersen et al. ............. 99/353 |
| 4,251,554 A | * | 2/1981 | Baisden ...................... 426/128 |
| 5,359,924 A | * | 11/1994 | Roberts et al. .............. 99/416 |
| 5,528,981 A | * | 6/1996 | Pettit .......................... 99/428 |

* cited by examiner

*Primary Examiner*—Lien Tran
(74) *Attorney, Agent, or Firm*—The Kline Law Firm

(57) ABSTRACT

An automated machine and process to form a food product consisting of a batter shell and a food filling. The process is started with a cooking matrix that includes a plurality of cooking openings to receive the batter. The batter is cooked to form shells. The automated process then inserts the food filling into the shells, and packages the filled shells as end products.

10 Claims, 37 Drawing Sheets

4000

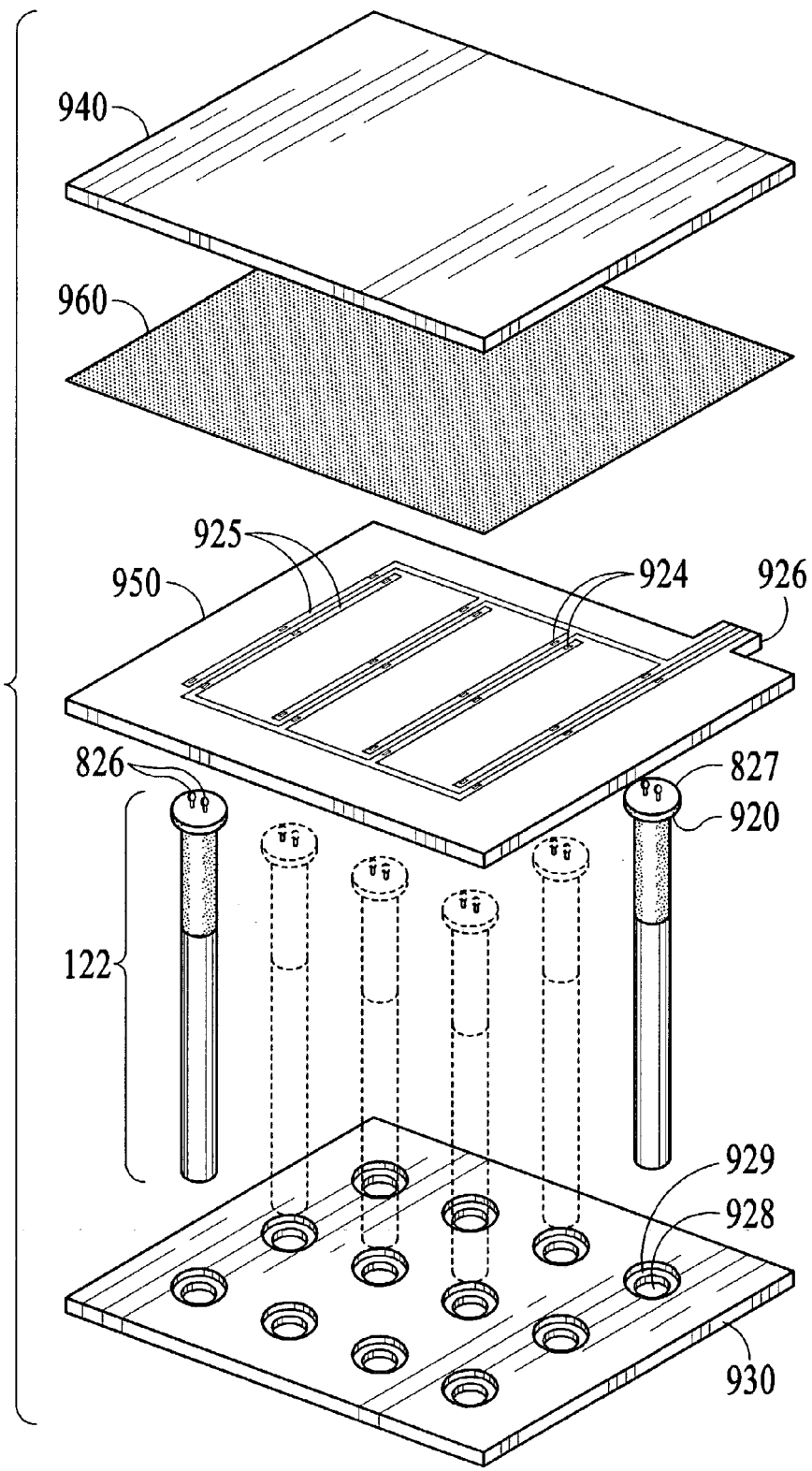

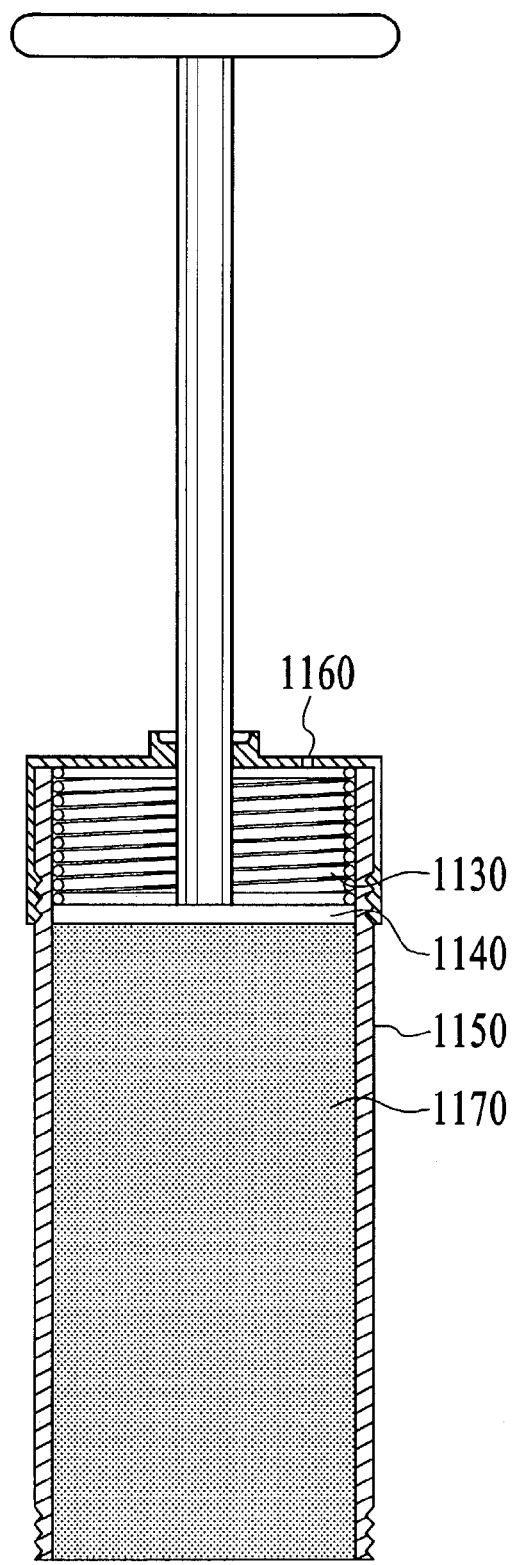
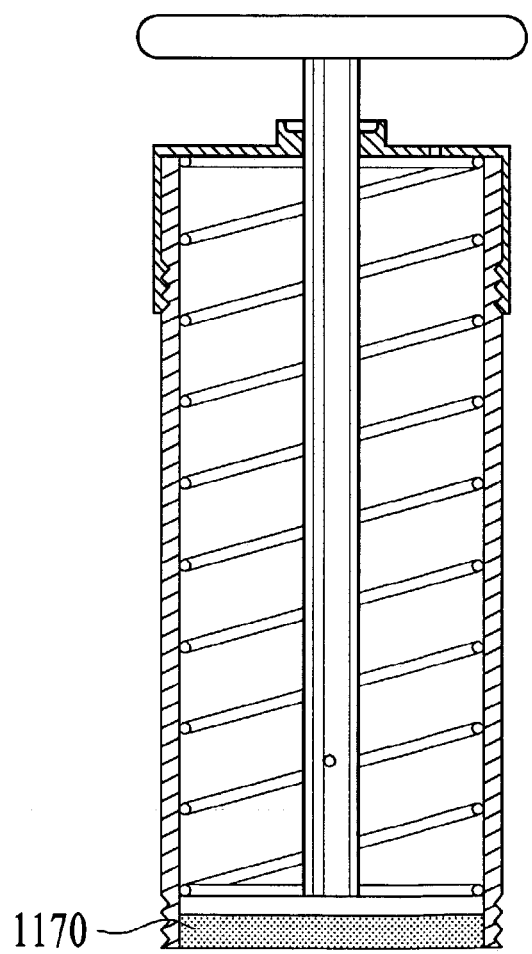
FIG. 11A
FIG. 11B

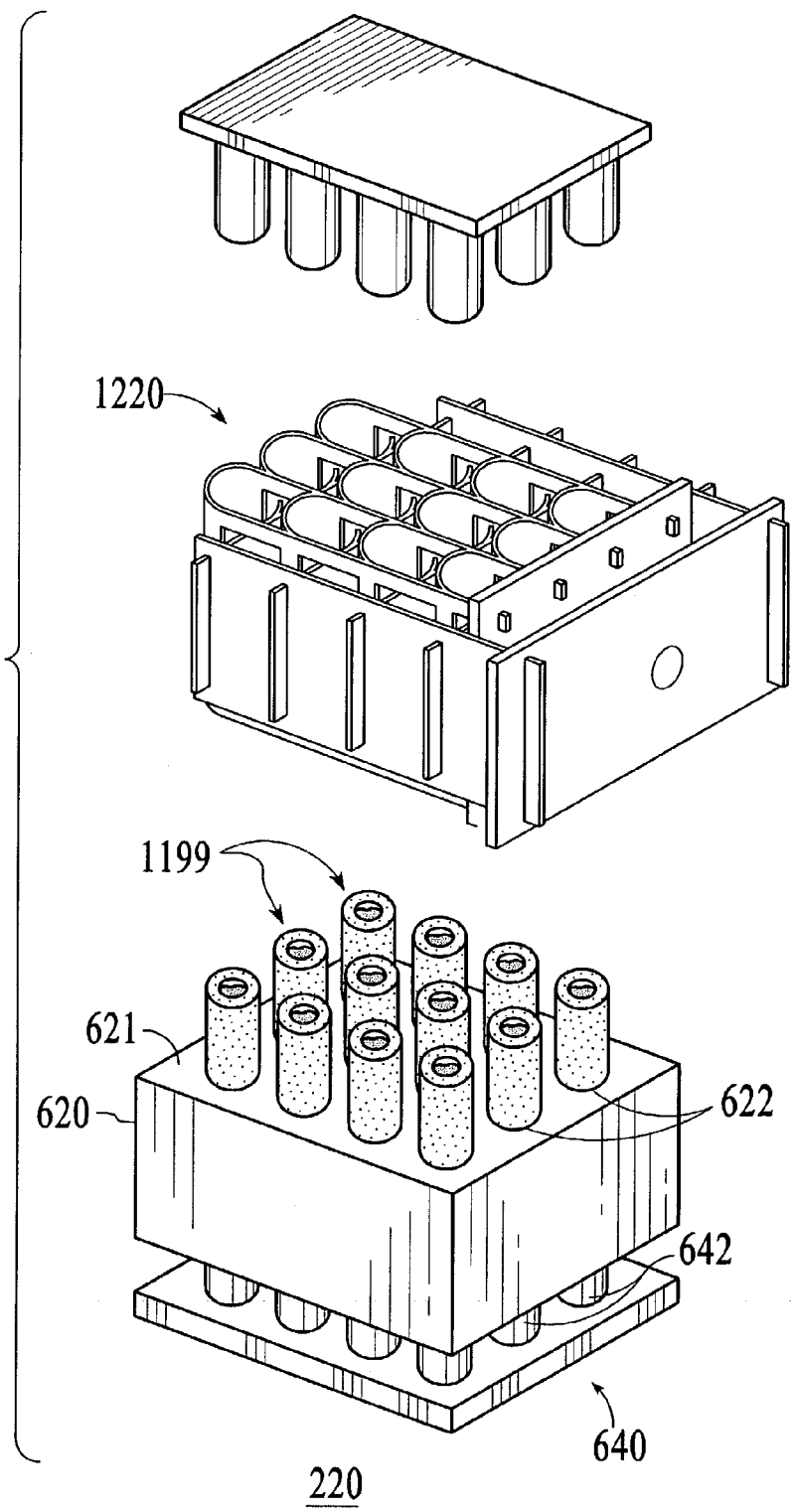

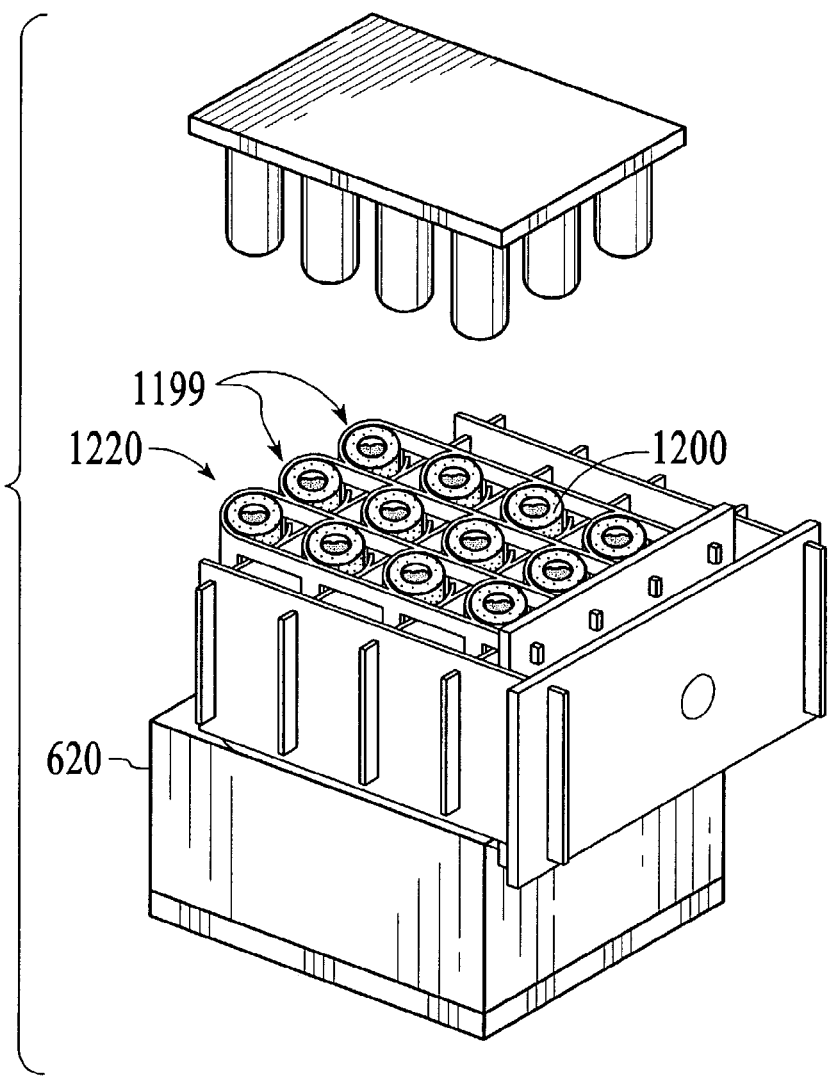

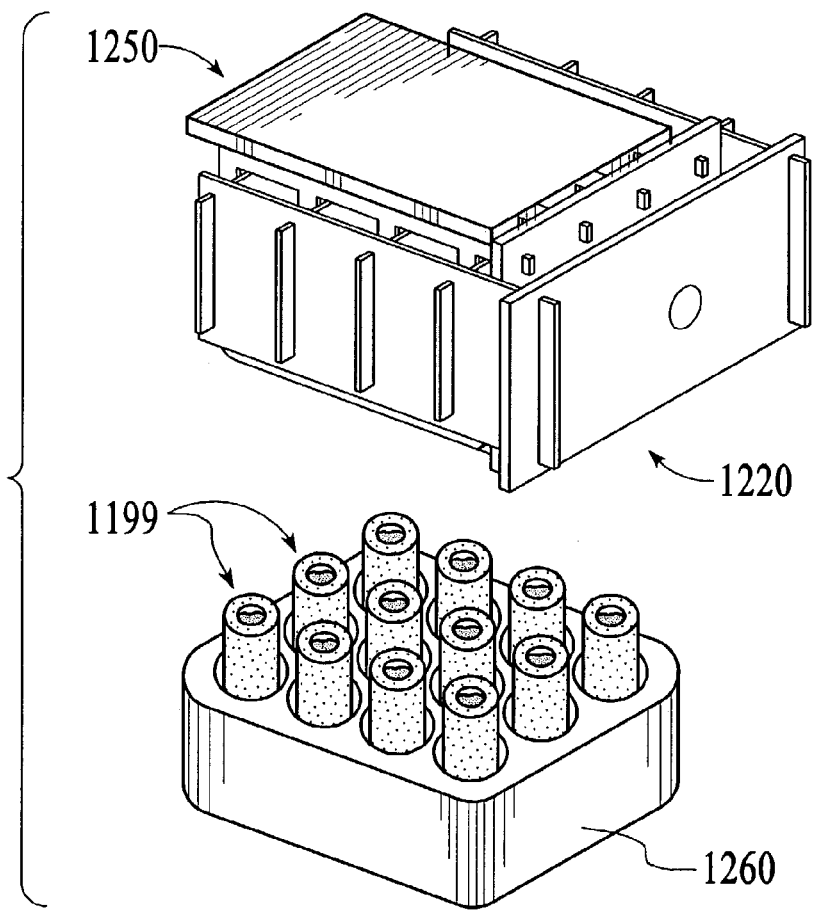

METHOD AND APPARATUS FOR MAKING A HAND HELD FOOD PRODUCT

BACKGROUND OF THE INVENTION

1. Field of the Invention

The present invention comprises an apparatus and method for making a hand held food product. More particularly, the present invention relates to cooking a molded batter shell with a food filled center, and packaging the food product.

2. Description of the Prior Art

Food products such as Ready-To-Eat ("R-T-E") meal or snack products vary widely in composition, shape, flavor, texture, and the ease in which the food product is consumed. The present invention generally relates to those food products which include a dipping sauce that is added to the food product after it is manufactured, usually by the consumer just prior to consumption. The food products include pancakes, waffles, cakes, cereal-based pre-mixes or the like.

The present invention provides an improvement in apparatus and methods for preparing food products characterized by an edible thermoplastic batter shell, and an extruded food filling such as a low moisture syrup, custard, fruit filling or the like. This improved food product offers the consumer the advantage of having both a manufactured food product as well as a flavored dipping sauce without the need to actually dip the food product. This is of particular interest to those consumers who eat while operating a motor vehicle. The dipping process can become messy as well as dangerous, as the driver moves their eyes away from the roadway to dip a food product, or wipe up a spill.

SUMMARY OF THE INVENTION

The present invention is an automated machine to make a hand held food product comprising a cooking matrix that includes a cooking block with a plurality of cooking openings to receive a batter at a first filling station. An inner cooking iron array with a plurality of inner cooking irons are inserted into the cooking openings of the cooking block to cook the batter shells. A second filling station comprises a reservoir to hold a food filling, which is inserted into the shells. After the food filling has been inserted into the shells, the cooking block is moved to a packaging station for transfer of the end product to desired packaging.

An advantage of the present invention is that it provides an automated method of preparing a filled shell food product that is hand held.

Another advantage of the present invention is that it performs the entire preparation process.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 9 is a perspective view of the inner cooking iron array.

FIG. 11A is a sectional view of a dispensing canister full of a food filling.

FIG. 11B is a sectional view of a dispensing canister almost empty of a food filling.

FIGS. 12A–E are perspective views of a matrix for cooking a plurality of batter shells.

DETAILED DESCRIPTION OF THE INVENTION

Figure 1:
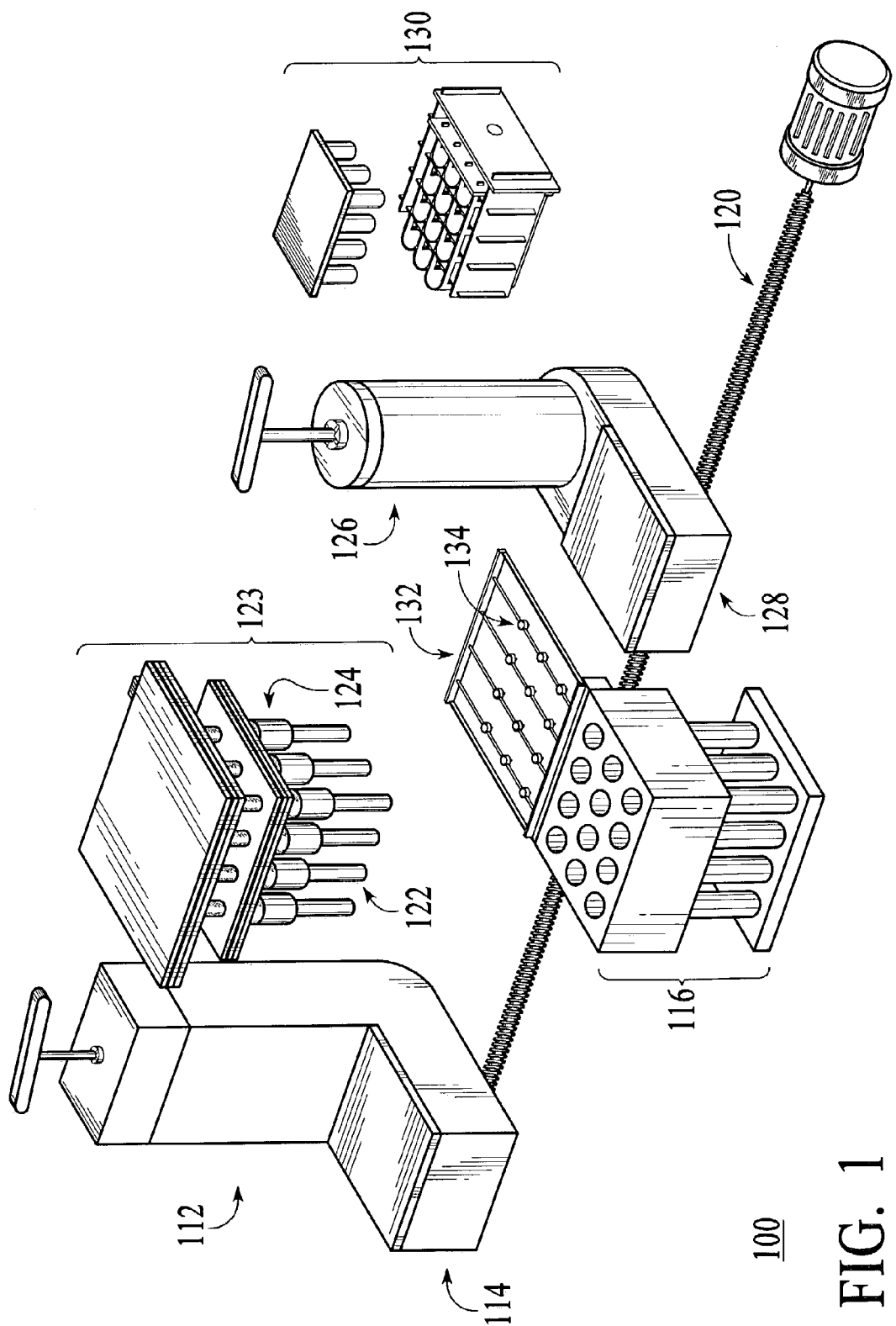
FIG. 1 is an exploded perspective view of the present invention shown without a carriage assembly.

Referring now to the drawings and first in particular to FIG. 1, there is shown an apparatus for preparing a simply shaped shell, typically a cooked batter shell. The batter shell is a thermoplastic baked food product made of an aqueous batter such as pancake, waffle, crepe, cake, doughnut, or the like. Also shown is an apparatus for filling the cooked batter shell with a flavored food filling such as a low moisture syrup, custard, fruit filling, chocolate, candy, vegetable, meat or the like, and packaging the completed R-T-E food product according to the preferred teachings of the present invention that is generally designated 100. In the most preferred form, the apparatus 100 generally includes a means for providing a plurality of cooked batter shells such as at least one hopper for retaining an aqueous batter 112, and a reservoir including at least one extrusion piston 114. The batter hopper 112 and reservoir 114 are affixed to one another in fluid communication. A cooking block assembly 116, means of transporting the cooking block such as a motor driven ajax threaded drive shaft 120, cooking iron matrix 123 including an inner cooking iron array 122, top cooking iron array 124, at least one hopper for retaining a food filling 126, a reservoir including at least one extrusion piston 128, means for packaging completed R-T-E food product 130, a surface cleaning appliance 132, and means for dispensing a scorch-retarding oil 134. While a cooker/extruder is the preferred equipment to provide this R-T-E food product, other conventional equipment and techniques can also be employed in the manufacturing as well as packaging.

Figure 2A:
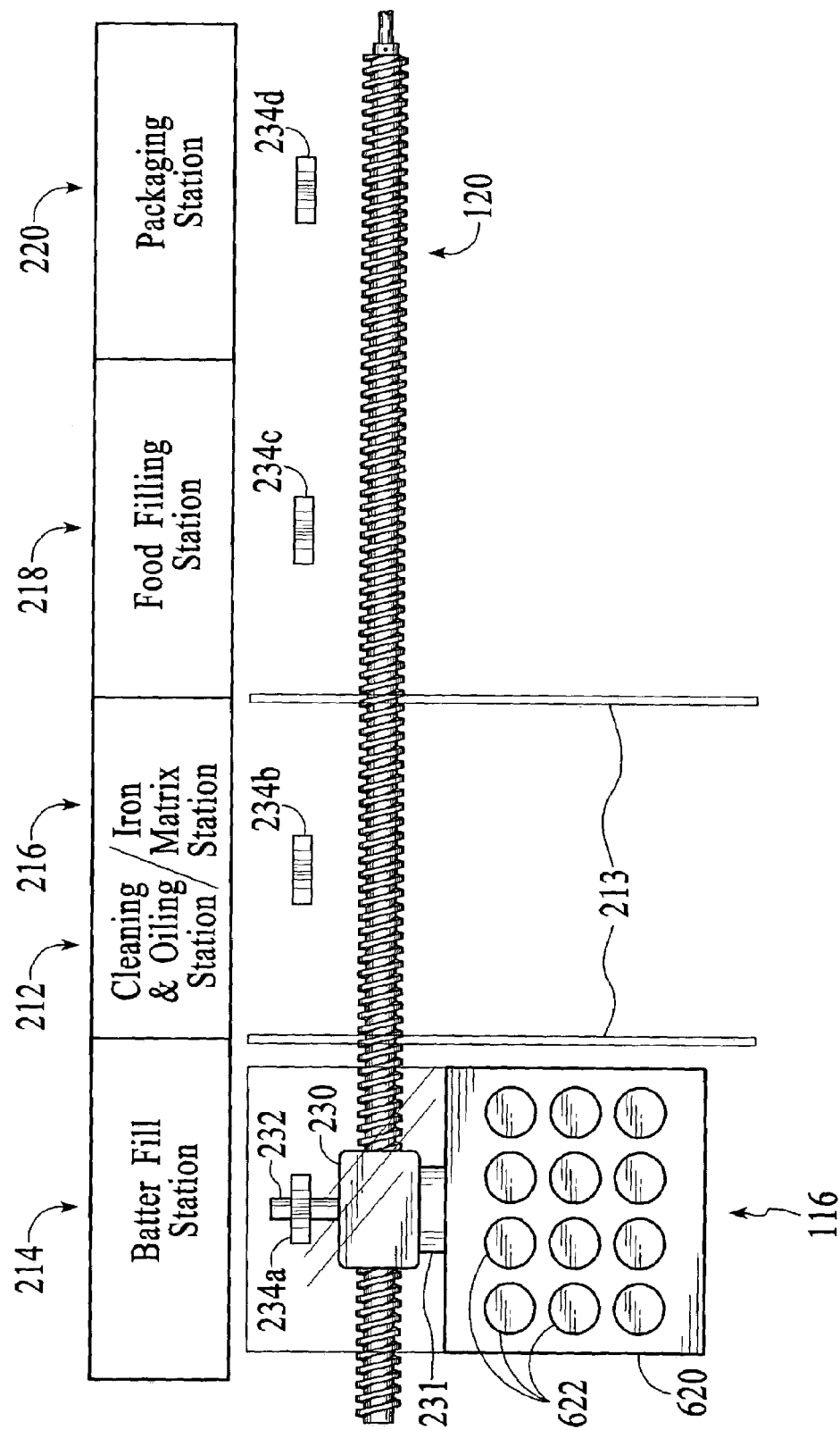
FIGS. 2A–H are block diagrams illustrating the general order of steps that take place in the R-T-E food product's preparation process.
Figure 2B:
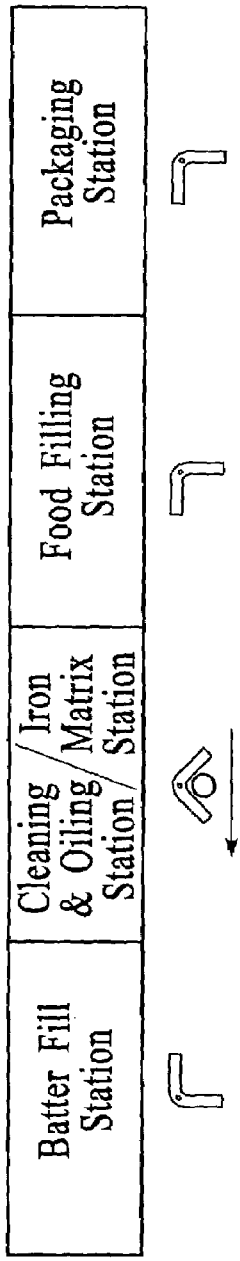
Figure 2C:
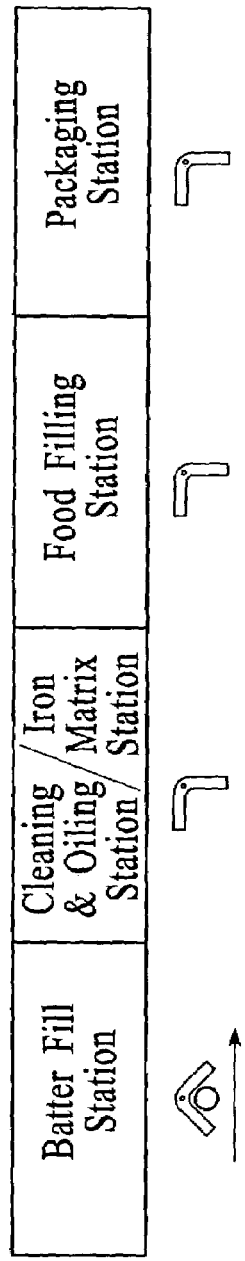
Figure 2D:
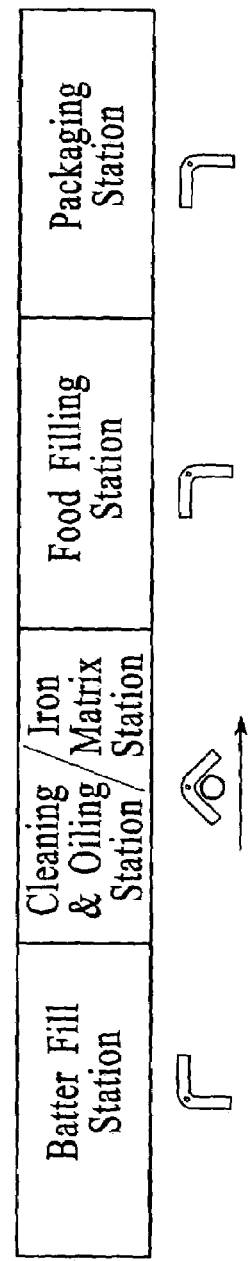
Figure 2E:
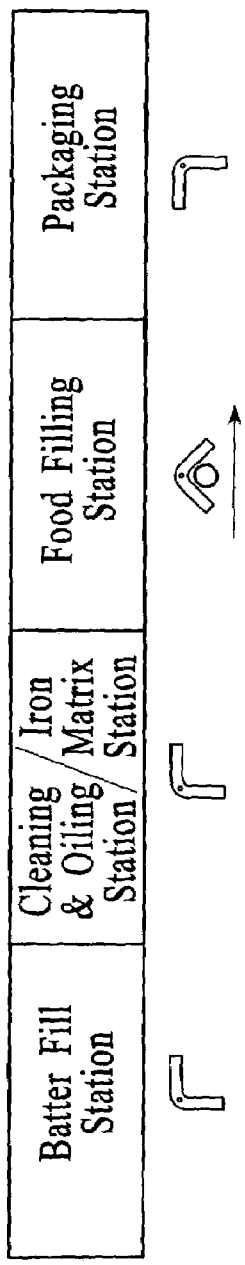
Figures 2F, 2G, 2H:
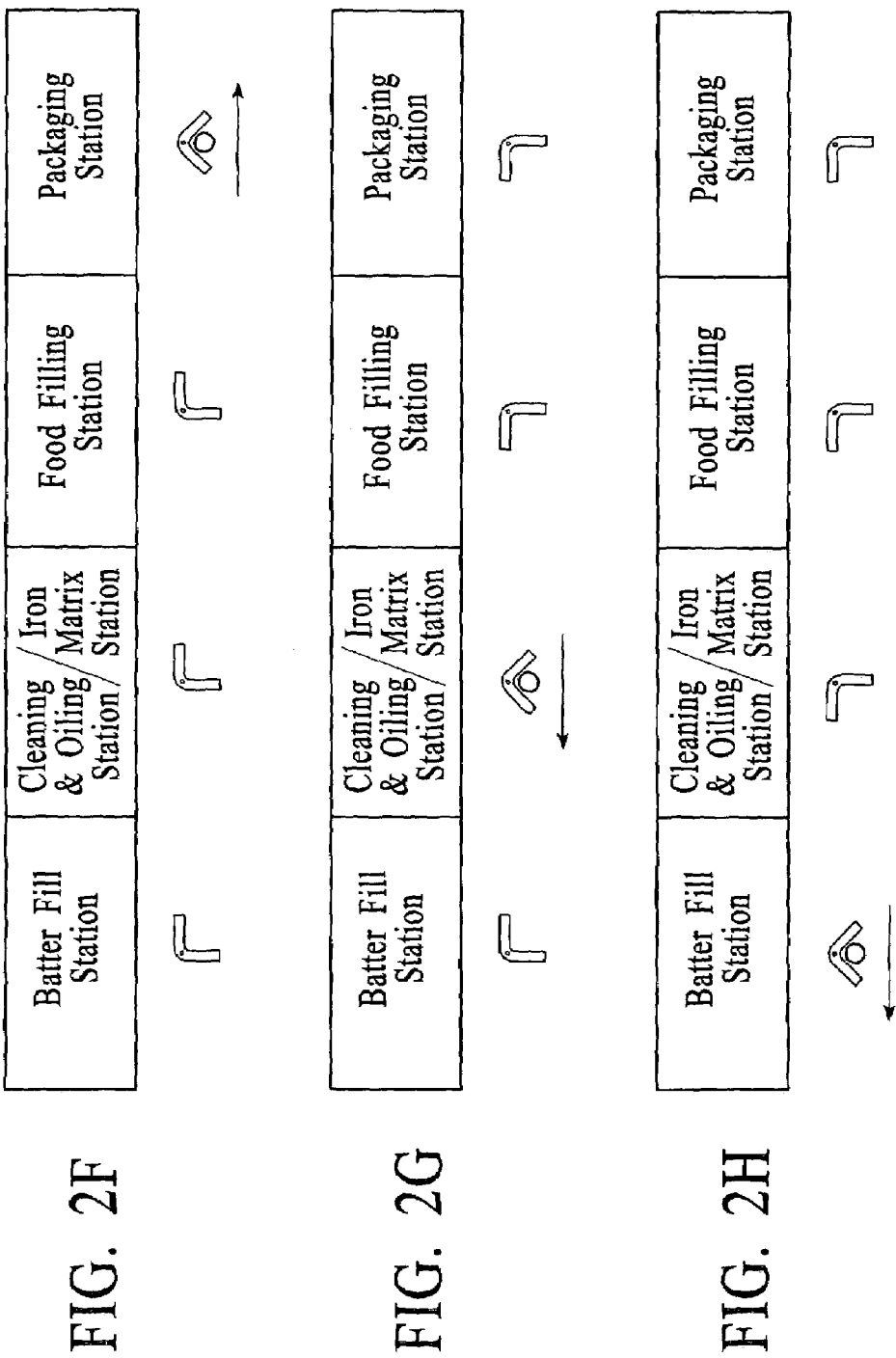

Referring now to FIG. 2A, the process for manufacturing the R-T-E food product is generally designated 200. The cooking openings block 620 begins at the cleaning/oiling station 212. The cooking openings block 620 is heated, cleaned, and scorch-retarding oil is applied. Thin deflector walls 213 are positioned such that oil over-spray is reduced to the confines of oiling station 212. Heating, cleaning, and oiling processes are discussed in greater detail in FIGS. 13A–E. Coupling 230 is a solid material, preferably a metal, that is connected to cooking openings block 620 via insulator 231. The coupling includes a female threading through the center, and a pin 232 protruding in order to engage rocker switches 234a–d. Once the oil has been applied, threaded drive shaft 120 is rotated clockwise, and the cooking assembly is thereby transported toward batter fill station 214. When pin 232 trips rocker switch 234a, threaded drive shaft 120 is stopped, and cooking openings 622 become filled with batter that is extruded from batter reservoir (not shown). Threaded drive shaft 120 then rotates counter-clockwise, transporting cooking block assembly 116 transversely toward cooking iron matrix station 216, and comes to a stop when pin 232 trips rocker switch 234b. The cooking iron matrix is illustrated in greater detail in FIGS. 8–10.

Threaded drive shaft 120 is next rotated counter-clockwise and comes to a stop when pin 232 trips rocker switch 234c at the food filling station 218. Food filling is introduced into the void of the cooked batter shells (that were created by the inner irons), then threaded drive shaft 120 is rotated counter-clockwise and comes to a stop when pin 232 trips rocker switch 234d at the packaging station 220. The completed R-T-E food product is then extruded from cooking openings block 620, and packaged. Threaded drive shaft 120 is rotated clockwise and comes to a stop when pin 232 trips rocker switch 234b whereby the cooking process is repeated. FIGS. 2B–H further illustrate the operation of rocker arm switches by following the arrow of direction. Timers and computer systems integrated within machinery is well know in the art. The rocker switch system may easily be replaced by timers or a computer system to start and stop moving parts of the present invention.

Figure 3A:
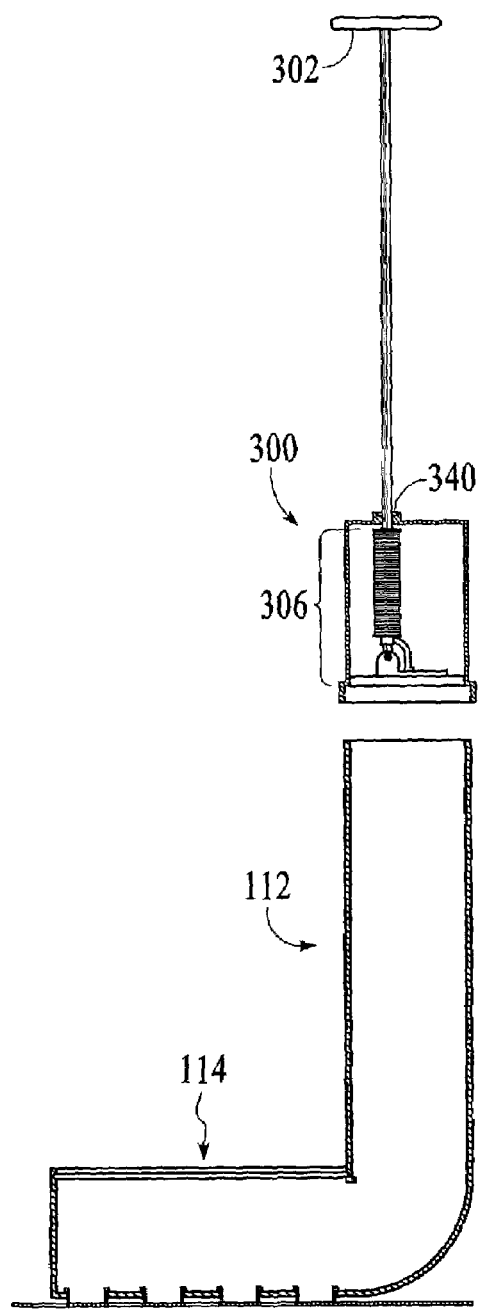
FIGS. 3A–D are sectional views of a batter hopper and reservoir.
Figure 3B:
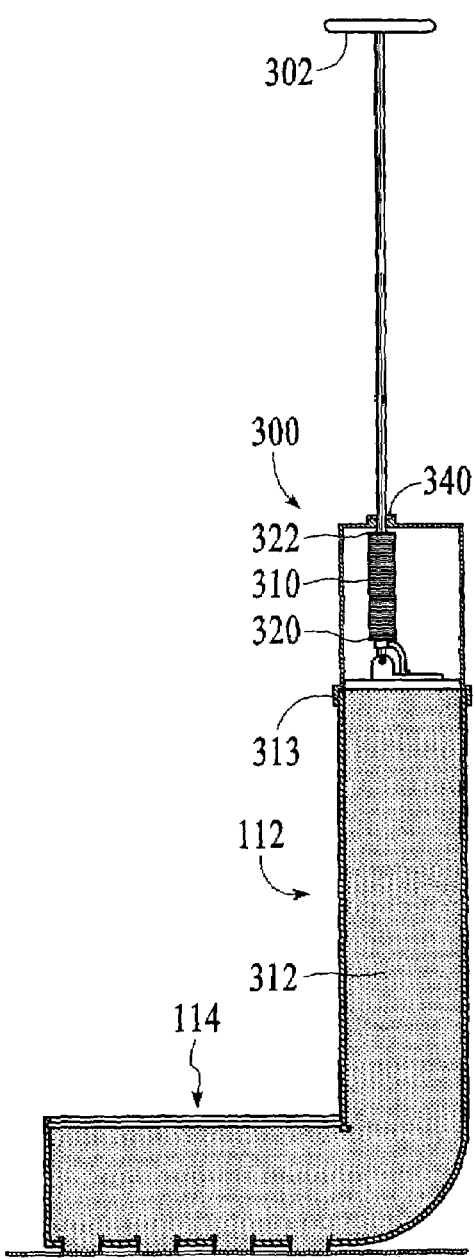
Figure 3C:
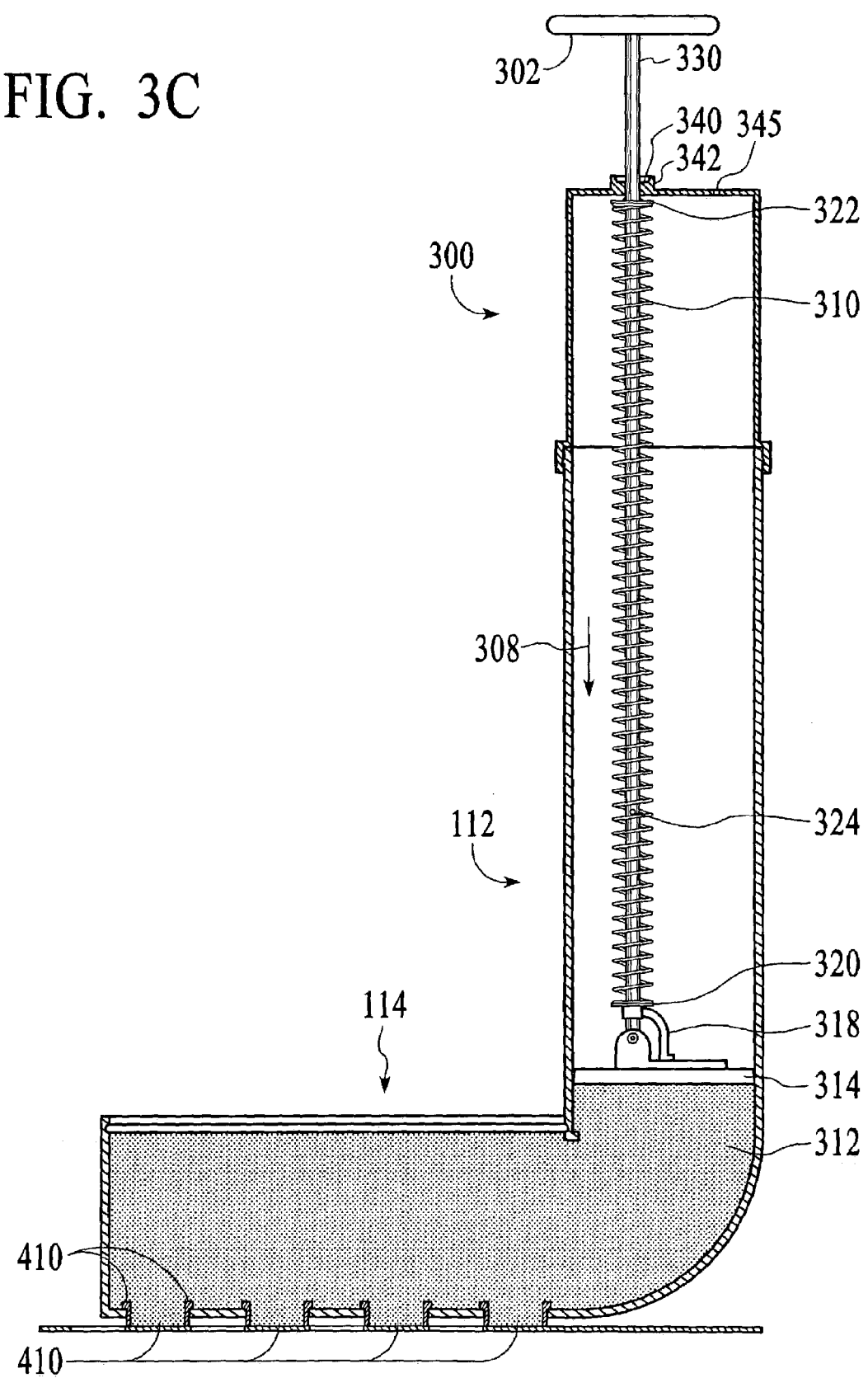
Figure 3D:
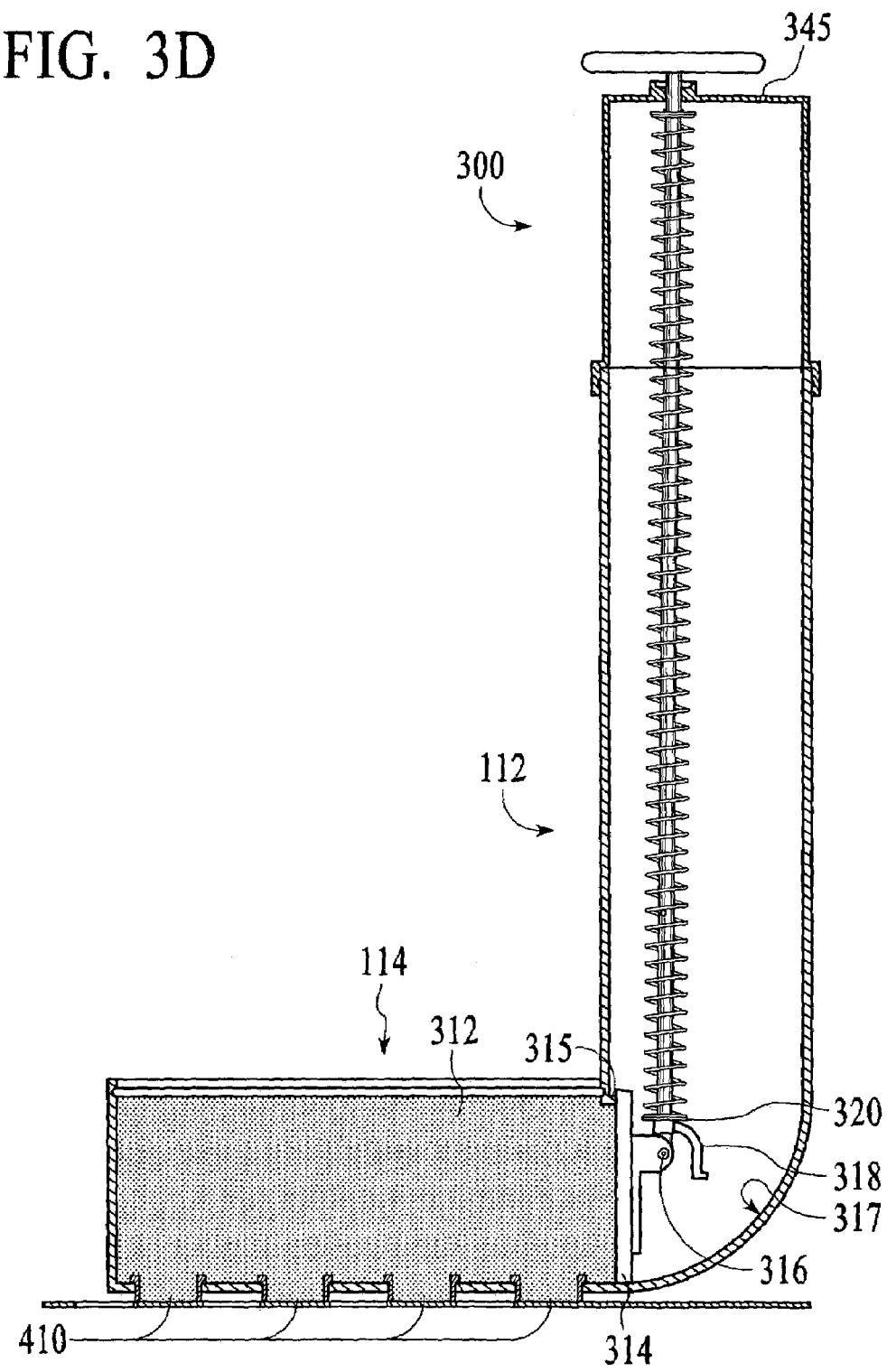

Referring now to FIGS. 3A–D. Handle 302 is pulled up completely, and is turned to lock plunger assembly 306 into the fully retracted position within cover 300. Cover 300 is then removed from hopper 112 in order for hopper 112 to be filled with an aqueous batter. FIG. 3B shows hopper and reservoir filled with an aqueous batter 312, and cover 300 replaced and removably affixed 313 onto top of hopper 112. Spring 310 is held between washers 320 and 322, and locked in a retracted position. In FIG. 3C, handle 302 is then pulled up slightly, and turned one half turn to release pin 324 from channel 340 of plunger assembly lock 342. With spring 310 now released from the locked position, a slight pressure is applied to batter 312 via plunger 314. Plunger 314 descends in the direction 308 as batter has been extruded from reservoir 114 through apertures 410 of bushings 440. A breather hole 345 is included in order to release any back pressure caused when plunger 314 descends, and ascends through hopper 112. The use of stabilizer arm 318, keeps the plunger 314 horizontal during it's descend due to the offset position of guide rod 330. In FIG. 3D, more batter has been extruded from reservoir 114, and plunger 314 has come into contact with ledge 315. Ledge 315 allows plunger 314 to pivot, thereby scraping edge 317 clean. A sensor may be included at ledge 315 to alert the operator that the batter supply is low.

Referring now to FIGS. 4A and 5A–F, an apparatus to accommodate, measure, and extrude an aqueous batter is shown here that is generally designated 400. Extrusion pistons 420 are normally at least partially disposed within cylinders 424, but are shown as removed in this figure for illustration purposes only. Extrusion pistons 420 are first positioned within cylinders 424 in such a manner whereas distal ends 426 of extrusion pistons 420 are flush with bottom surface 428 of cylinder block 422. Measuring device 430 is deployed within reservoir 114. An aqueous batter is introduced into batter hopper 112, and the cover 300 is removably affixed to the top of the batter hopper. Measuring device 430 ascends partially out of reservoir 114, such that the reservoir seal 419 is positioned at approximately the area designated 425 marked on cylinder block 422. Reservoir seal 419 prevents any batter from seeping out of the top of reservoir. In this position, reservoir 114 fills with a portion of the aqueous batter from hopper 112. Cylinder block 422 then descends back into reservoir 114, and comes to a stop when bottom surface 428 comes in contact with top surface 429 of bushings 440. During this process, piston assembly 421 remains stationary. This action causes the aqueous batter to be drawn into cylinders 424 with the assistance of a plunger or o-ring 423 such as that of a syringe. Excess batter that is squeezed against bottom floor 417 of reservoir 114 is pushed between bushings 440, and back into hopper 112. Sliding valve 510 is retracted in direction 501 such that apertures in sliding valve are aligned with apertures 410 of bushings 440. Piston assembly 421 quickly descends, causing extrusion pistons 420 to be thrust through cylinders 424 until distal ends 426 of extrusion pistons 420 are flush with bottom surface 428 of cylinder block 422 causing the aqueous batter to be extruded from cylinders 424, and out through apertures 410 of bushings 440. This system provides an equally measured volume of aqueous batter to be passed through each aperture 410. The volume may be adjusted to accommodate a variety of batters such as waffle, pancake, crepe, and the like, by raising or lowering the top-dead-center of the piston assembly 421. Alternately, this entire assembly may be permanently or temporarily replaced with a hopper including augers (described below) in the reservoir in order to dispense a potato mixture such as mashed potatoes, thereby creating a cooked potato shell that may later be filled with custard, sour cream, yogurt, or the like. It is also understood that the auger assembly can also be used to dispense cooked rice into the cooking block. In this case, the cooking block need not be heated, and cooking oil spray may be replaced with water or another starch-resistant spray. In this mode, cooked rice is compressed into cylinders to form a shell, then the aperture of the shell is filled with seafood, vegetables, legumes, or the like.

Figure 4A:
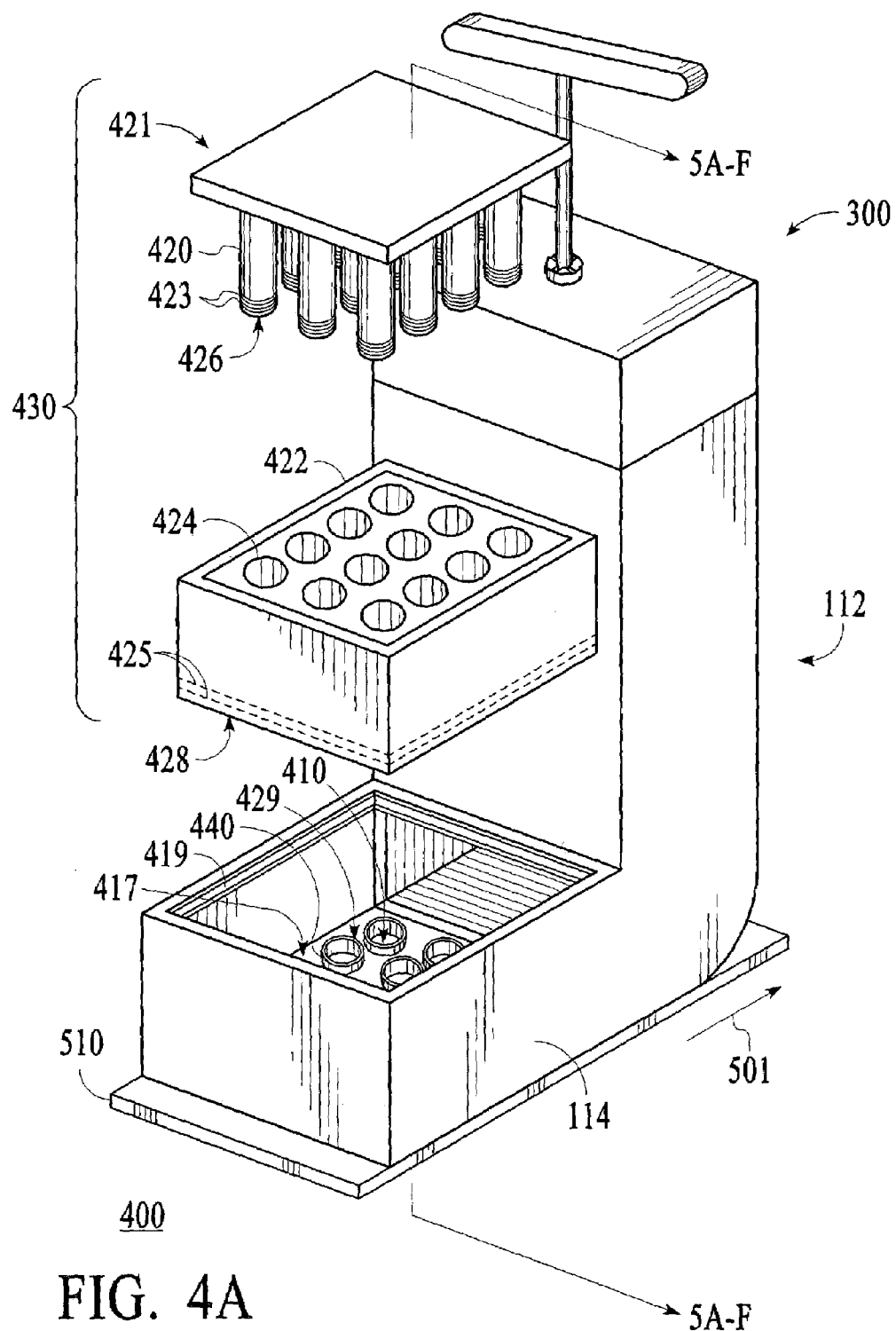
FIGS. 4A–D are perspective views of batter introduction assemblies.
Figure 4B:
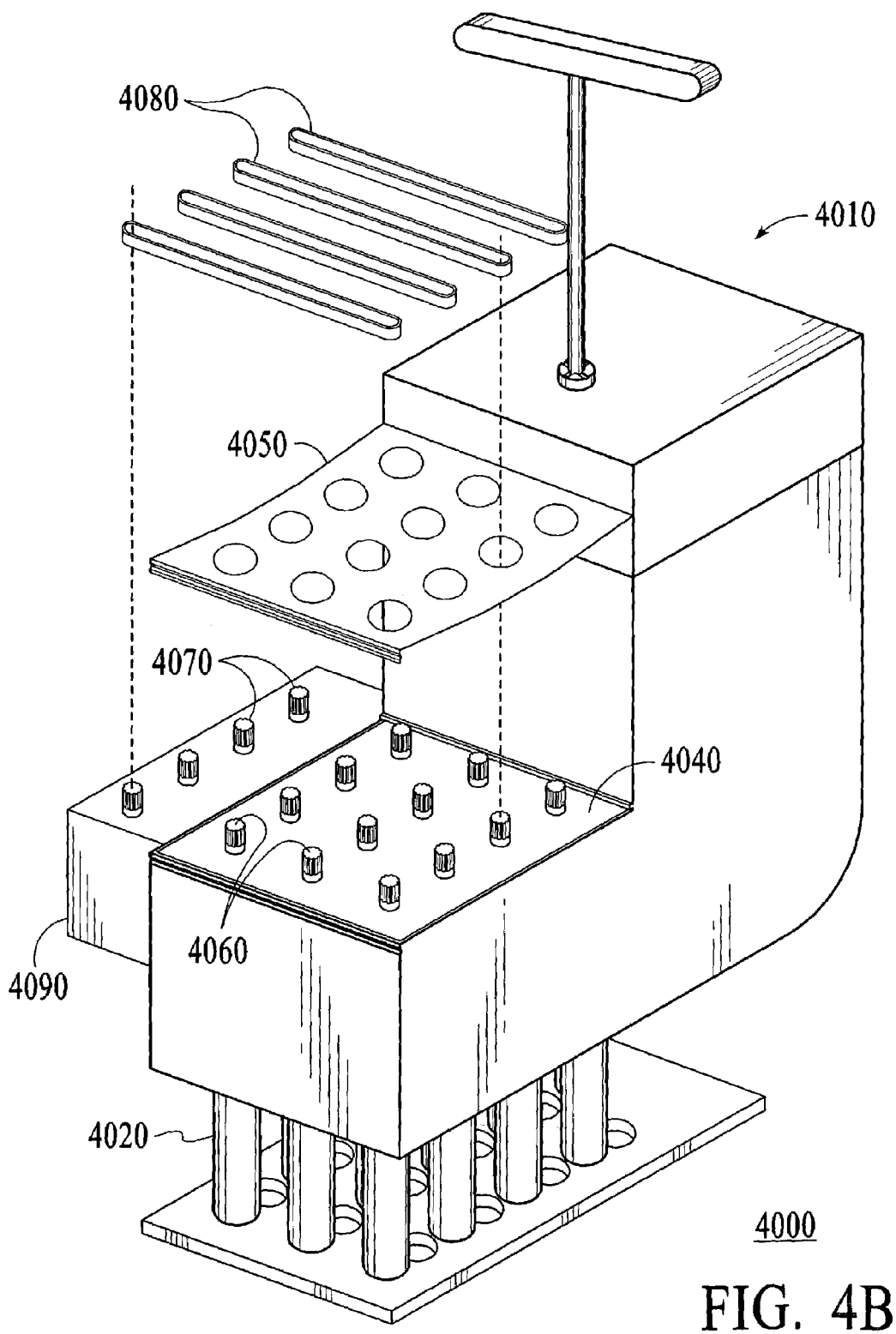
Figure 4C:
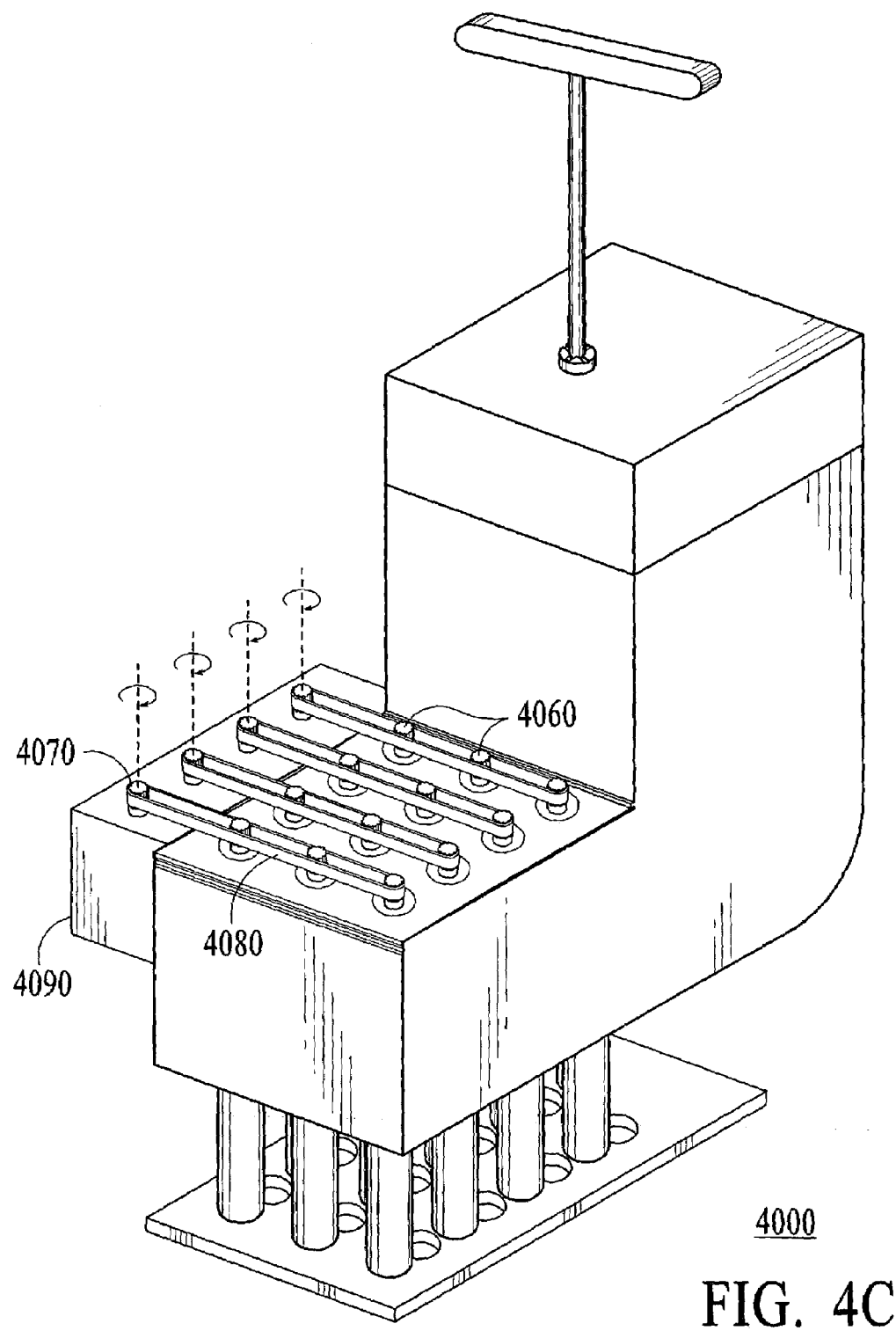
Figure 4D:
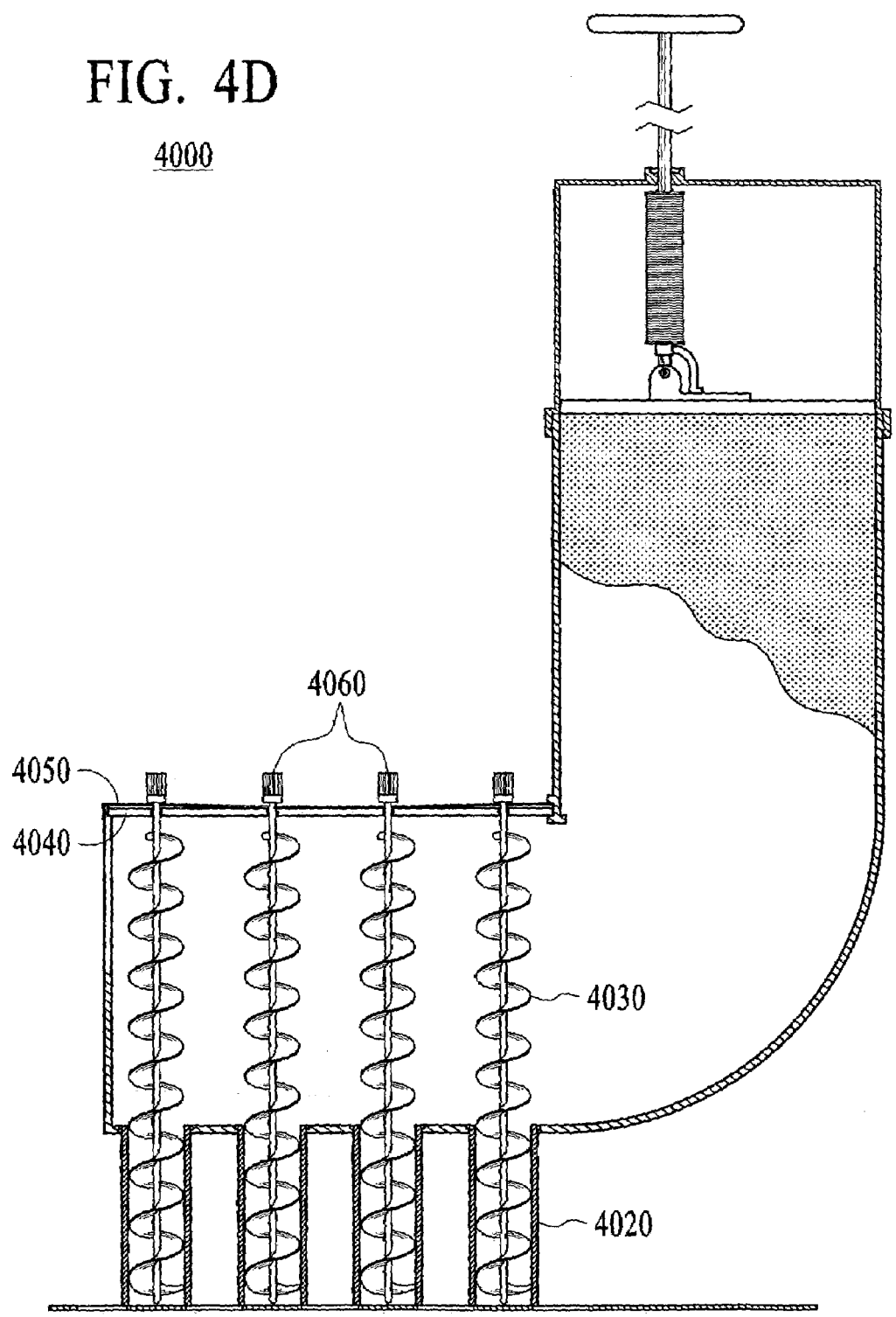
Figure 5A:
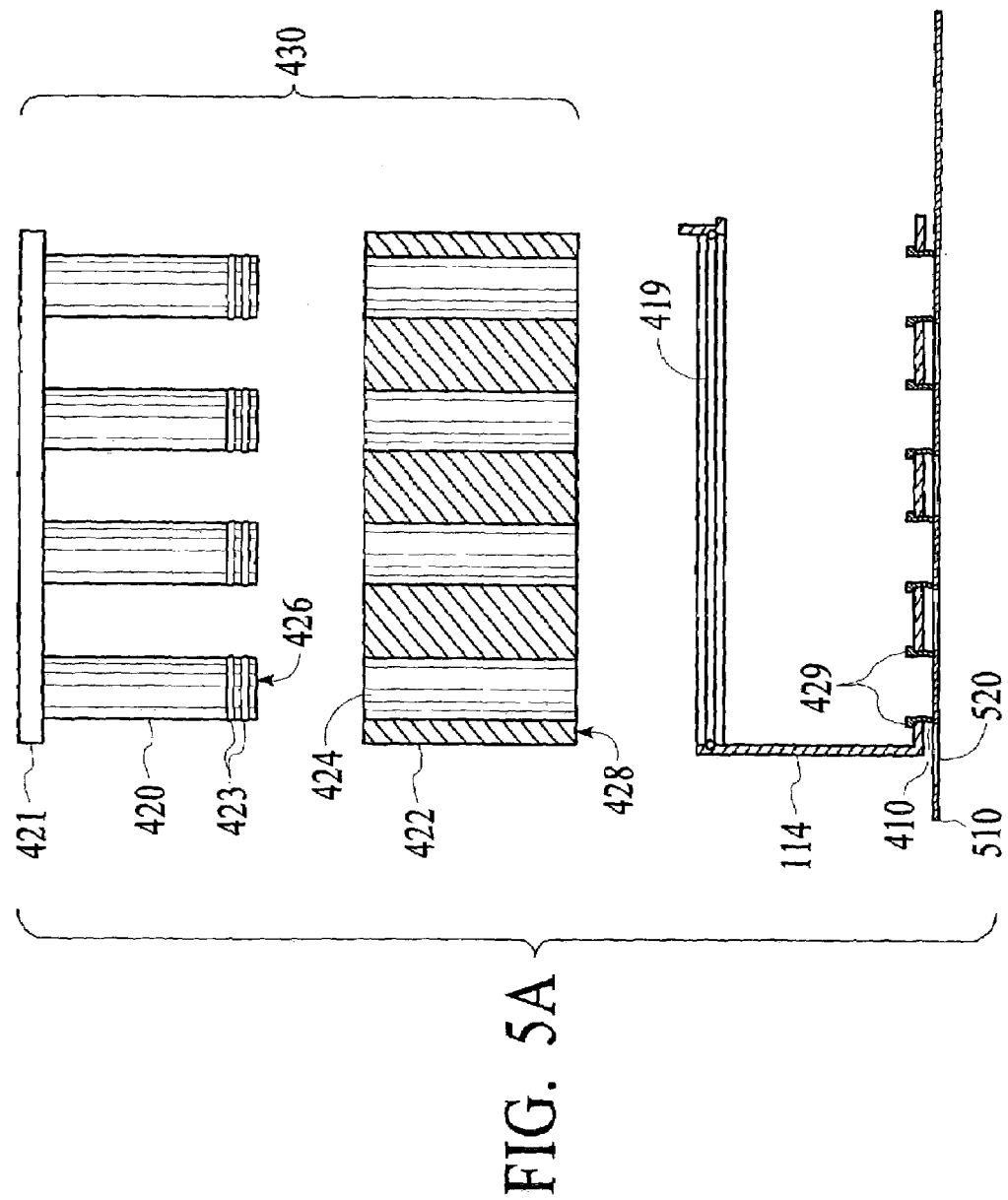
FIGS. 5A–F are sectional views of a reservoir and measuring/extruding device.
Figure 5B:
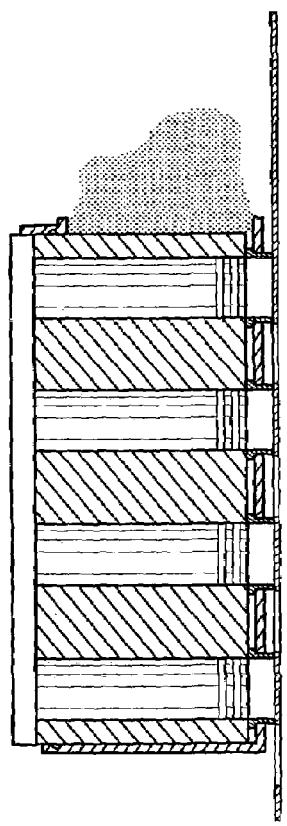
Figure 5C:
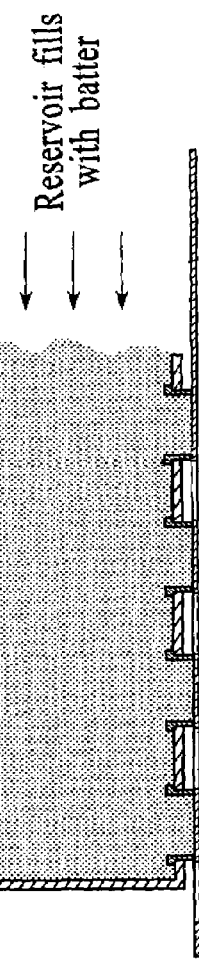
Figure 5D:
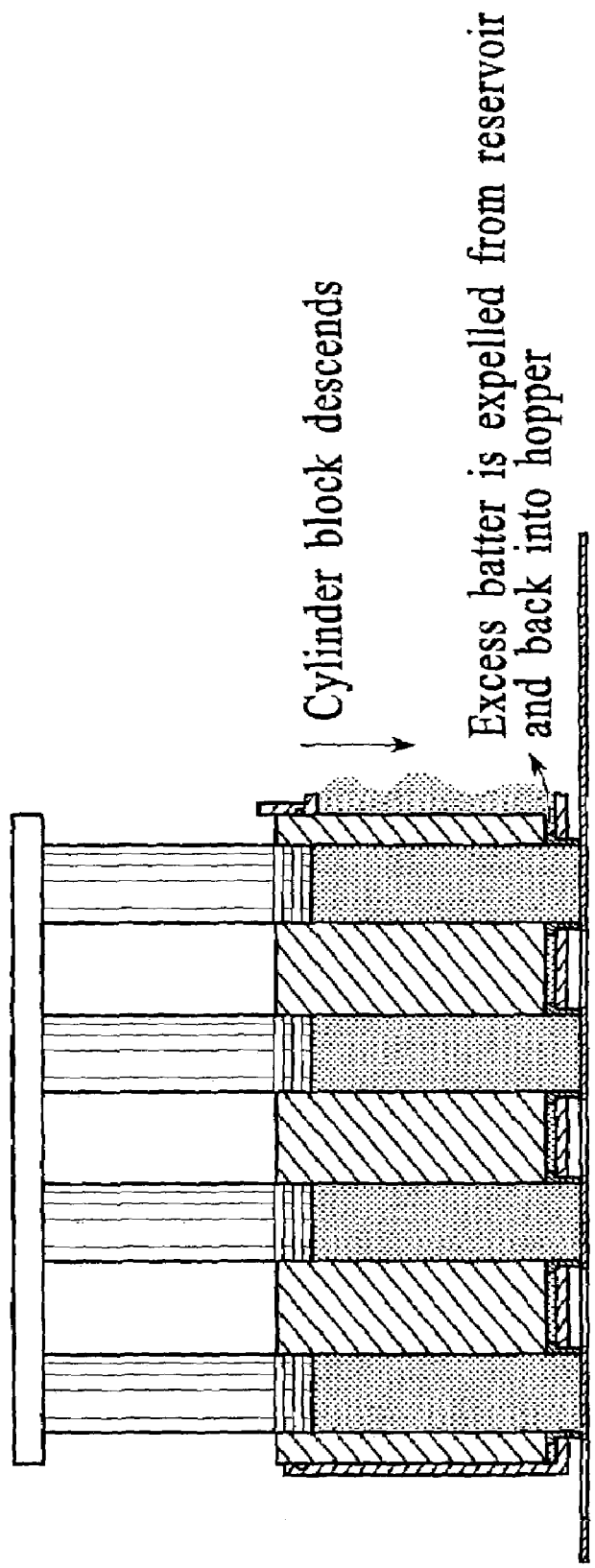
Figure 5E:
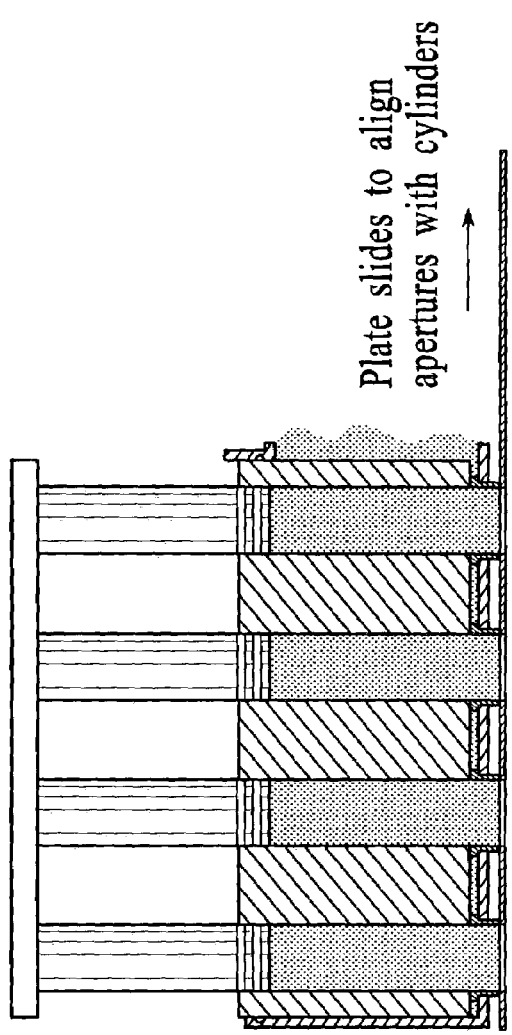
Figure 5F:
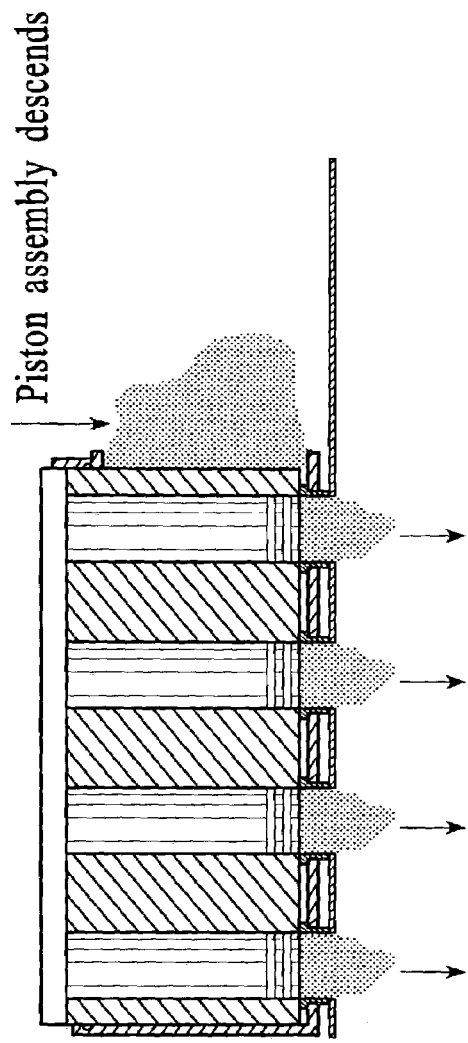

Referring now to FIGS. 4B–D, an apparatus to accommodate, measure, and extrude a food product such as potato, rice, or the like is shown that is generally designated 4000. This food product is introduced into hopper 4010 in much the same way as previously described. Because this food product is non-aqueous, it is deployed through cylinders 4020 when augers 4030 are rotated. Augers are attached to a top plate 4040 which is held in place by clip 4050. At the top of each auger shaft is a spindle 4060. Spindles 4060 are rotated by drive spindles 4070 via belts 4080. Drive spindles 4070 are powered by motor/gear box 4090.

Figure 6A:
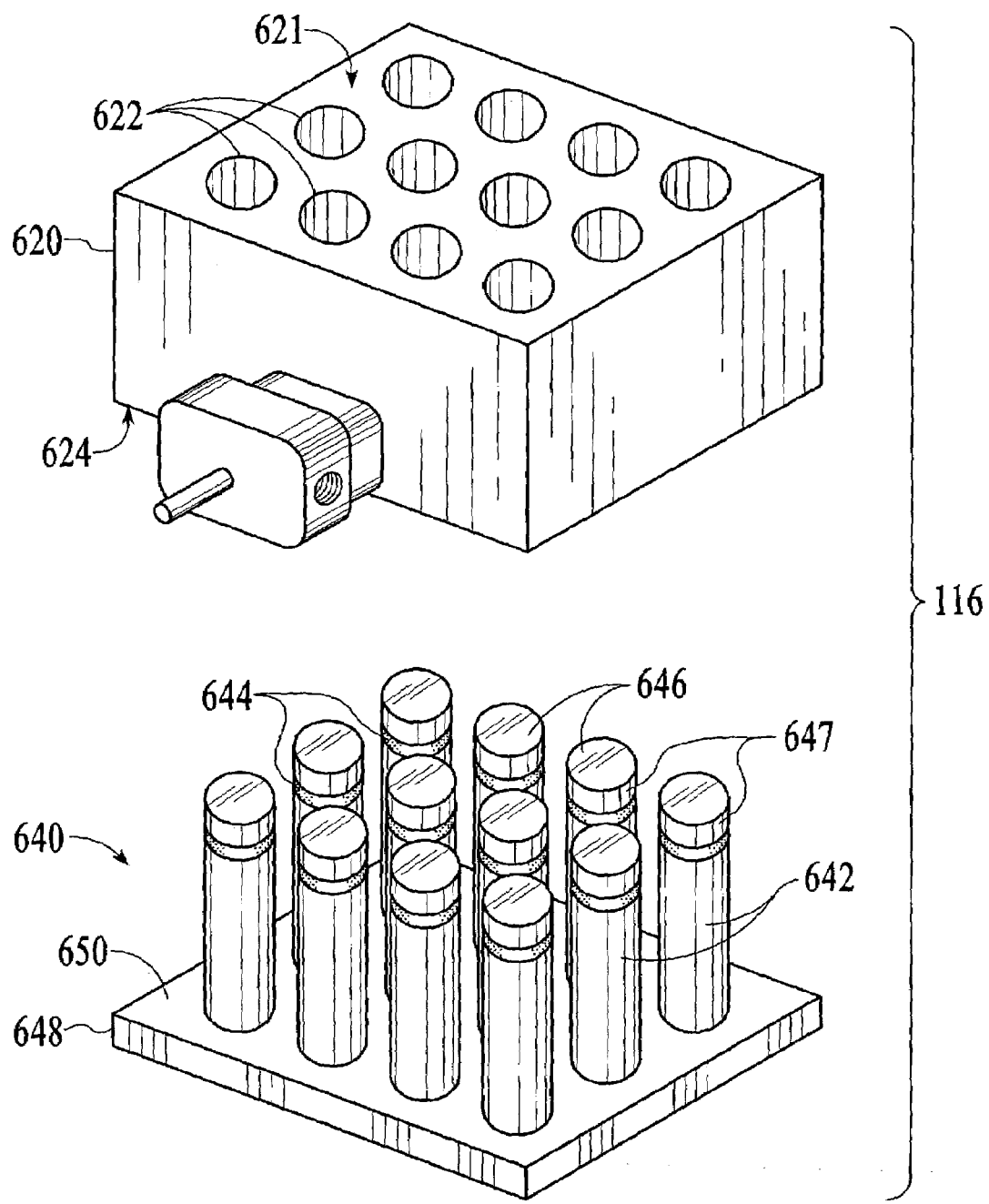
FIG. 6A is an exploded front perspective view of the cooking block assembly.
Figure 6B:
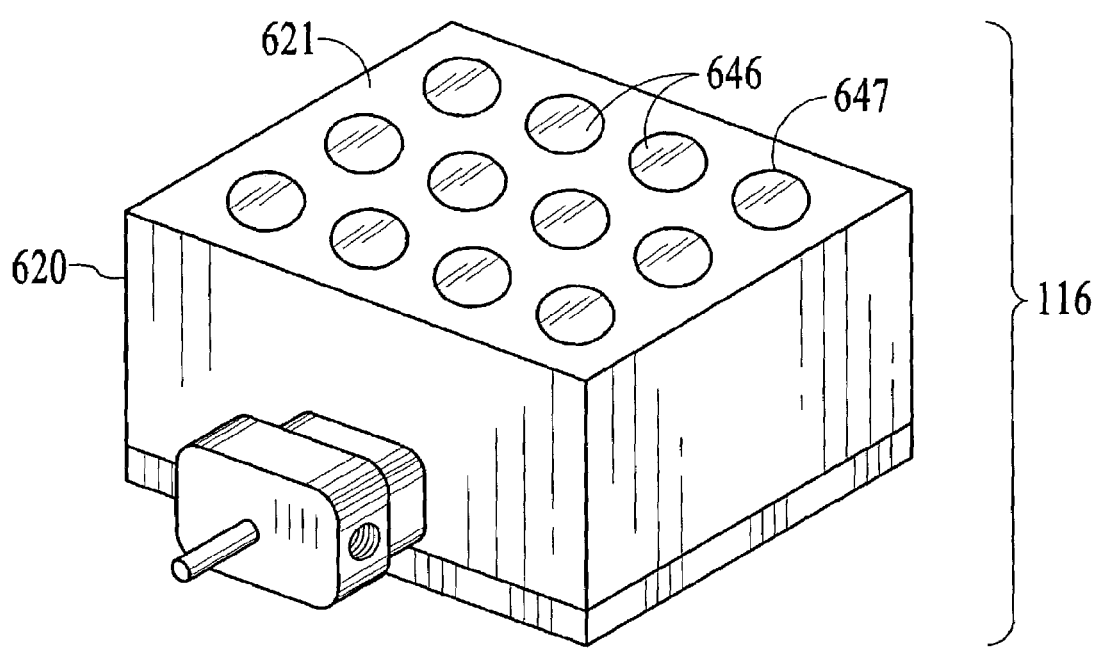
FIGS. 6B–C are rear perspective views of the cooking block assembly.
Figure 6C:
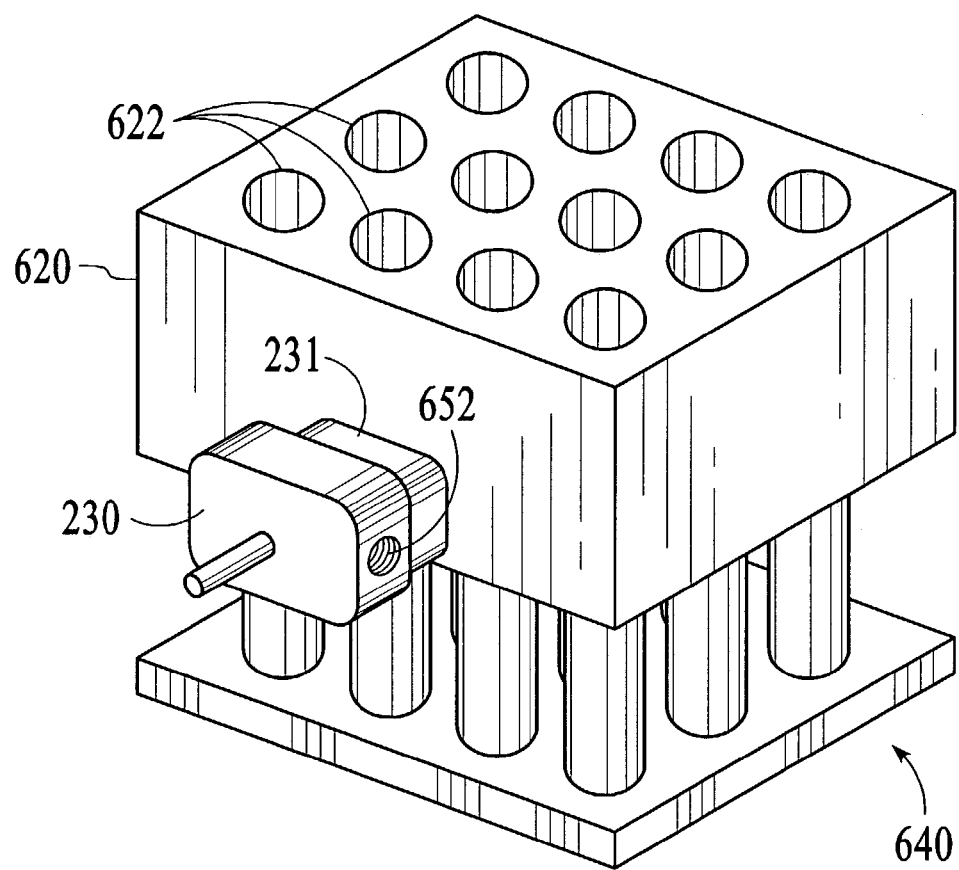

Referring now to FIGS. 6A–C, the device includes a matrix for cooking a plurality of batter shells 116, such as cooking openings block 620, and extrusion piston assembly 640. Extrusion pistons 642 are normally at least partially disposed within cooking openings 622, but are shown as removed in FIG. 6A for illustration purposes only. When fully deployed, extrusion pistons 642 are positioned within cooking openings 622 in such a manner whereas top surface 646 of bottom cooking irons 647 are flush with top surface 621 of cooking openings block 620, and top surface 650 of extrusion piston mounting plate 648 is flush with bottom surface 624 of cooking openings block 620. O-rings 644 are completely disposed within cooking openings 622. The O-rings 644 are comprised of a high temperature ABS material or the like. Although the bottom cooking irons include a tight seal with cooking openings 622, the O-rings 644 ensure the seal as well as providing an insulation between bottom cooking irons 647 and extrusion pistons 642. The seal thus formed prevents any oil or batter from seeping out.

FIG. 6B shows cooking block assembly 116 in the operation starting position. Cleaning appliance (not shown) cleans the face 621 of cooking openings block 620, and also cleans the top surface 646 of bottom cooking irons 647. FIG. 6C shows that cooking openings block 620 remains stationary while extrusion piston assembly 640 descends to a predetermined point such that the O-rings 644 remain completely disposed within cooking openings 622. Cooking block assembly 116 is then transported transversely to the batter fill station. This and other transporting motions are accomplished when a threaded drive shaft (not shown in this figure) is in communication with a female coupling 652 of coupling 230. Coupling 230 is attached to cooking openings block 620.

Figure 6D:
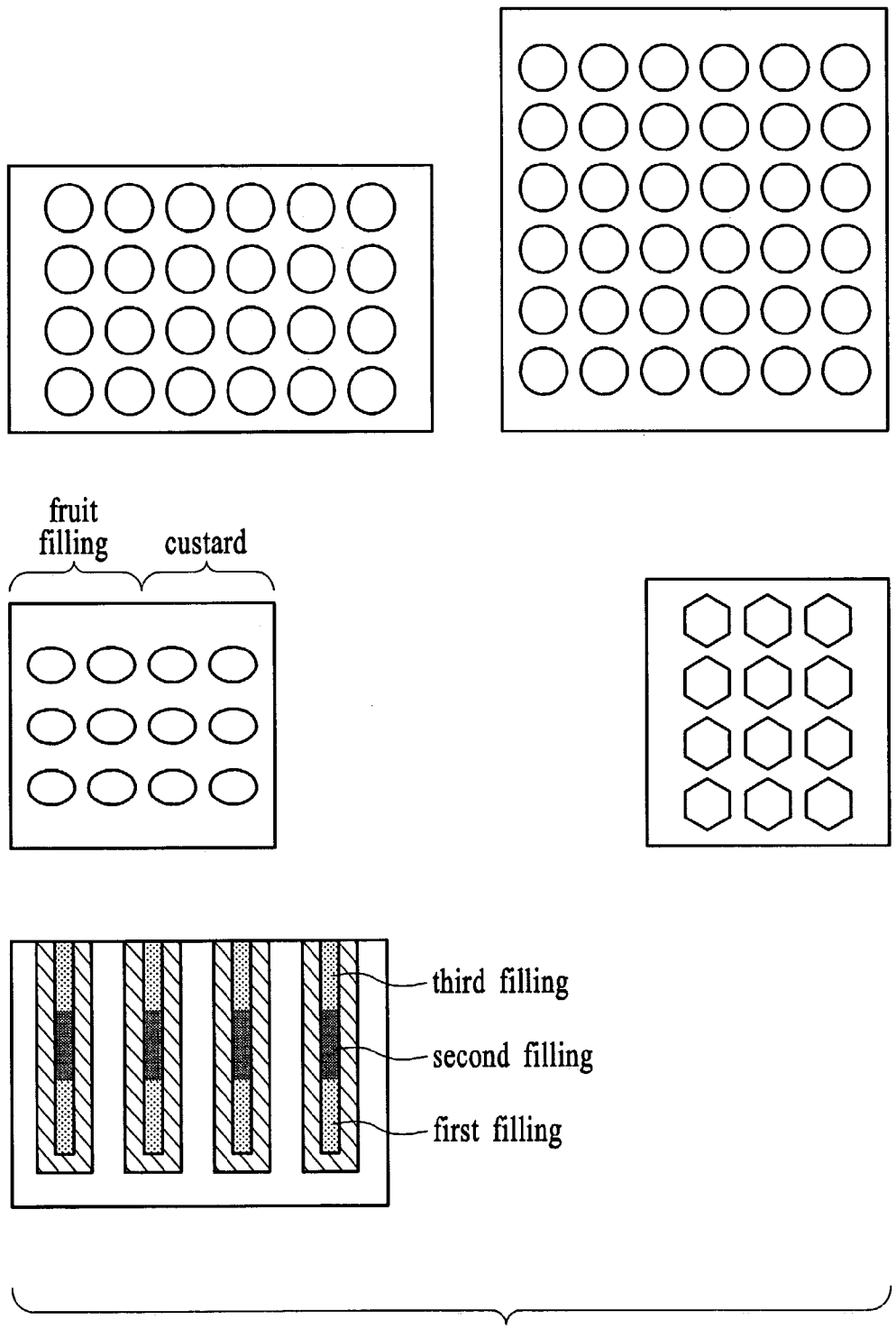
FIG. 6D are top views of only a few variations for a matrix for cooking a plurality of batter shells.

Referring now to FIG. 6D, a matrix for cooking a plurality of batter shells may be altered to include a variety of size, shape, or number of cooking openings. In addition, the filling process described in more detail in FIGS. 11A–D may be partitioned or a plurality of filling apparatus may be employed in order to fill part of the cooked batter shells of the matrix with one type filling, while filling another part with a different type filling. As such, the cooking matrix may be moved back and forth in order to partially fill a single cooked batter shell with a plurality of different type fillings.

Figure 6E:
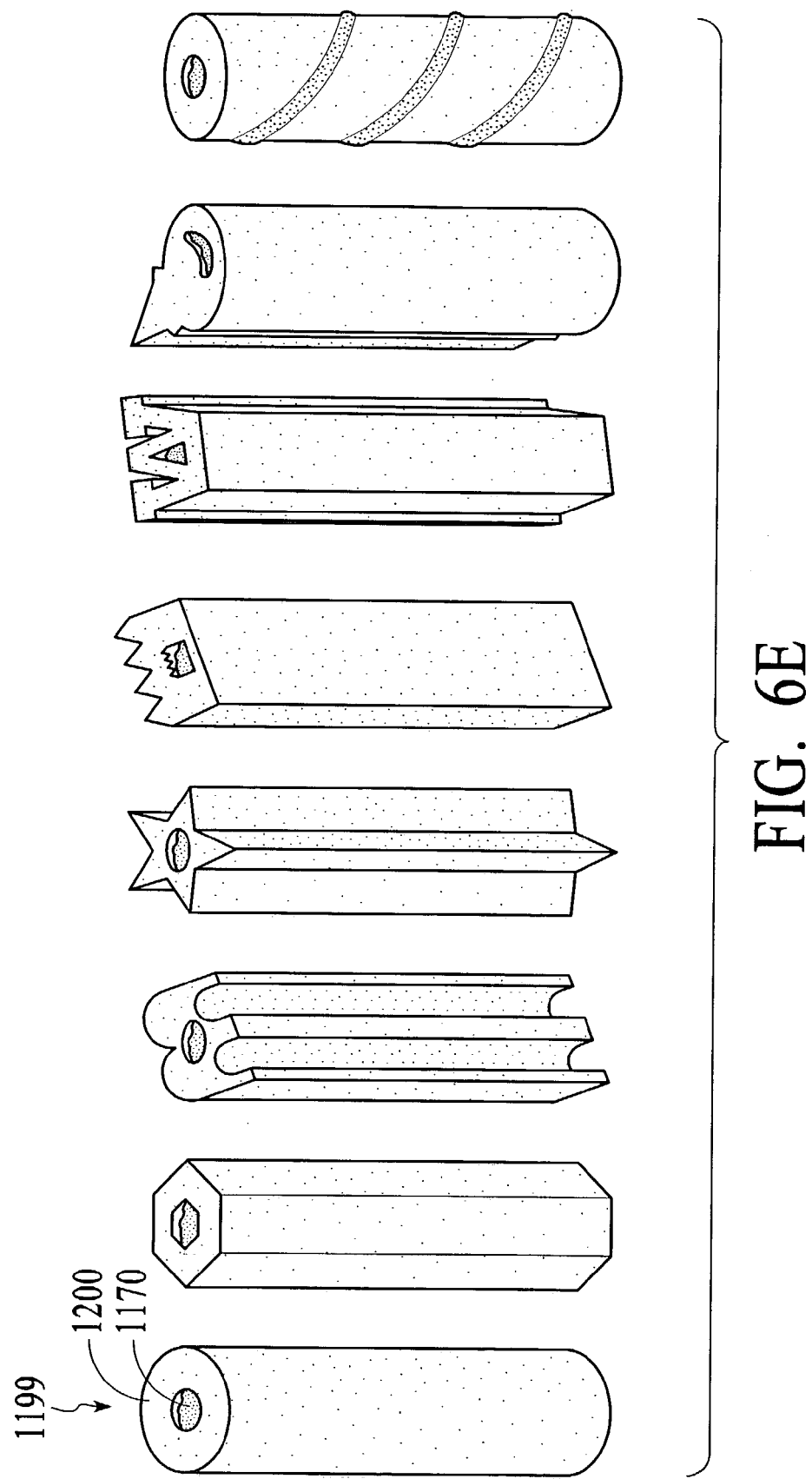
FIG. 6E are perspective views of only a few variations of a completed R-T-E food product.

Referring now to FIG. 6E, the hand held food product 1199 comprises a cooked batter shell 1200 filled with at least one food filling 1170. The preferred embodiment of the present invention shows a cylindrical cooked batter shell with a cylindrical void within that is filled with a food filling. Although the present invention has been described with reference to the preferred embodiments, workers skilled in the art will recognize that changes may be made in shape, size, form, quantity, and detail without departing from the spirit and scope of the invention.

Figure 7:
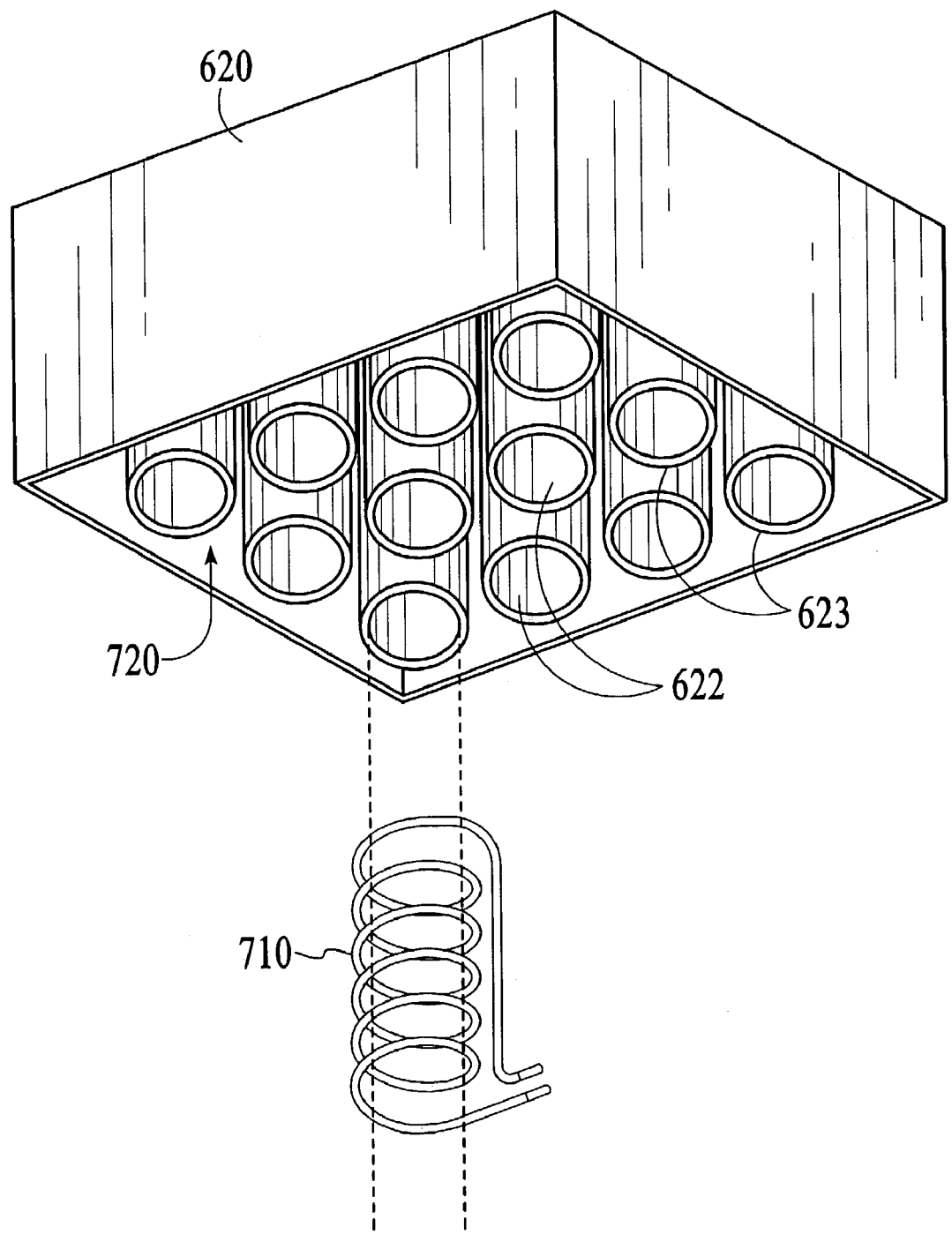
FIG. 7 is a perspective view of the underside of the cooking block.

Referring now to FIG. 7, the underside of cooking openings block 620. Each cooking cylinder 623 has a heating element 710 coiled around it in order to heat the cooking openings 622. Each heating element 710 is attached to a power strip (not shown) and its temperature is fully adjustable. The power strip and heating elements are disposed within void 720 of cooking openings block 620.

Figure 8A:
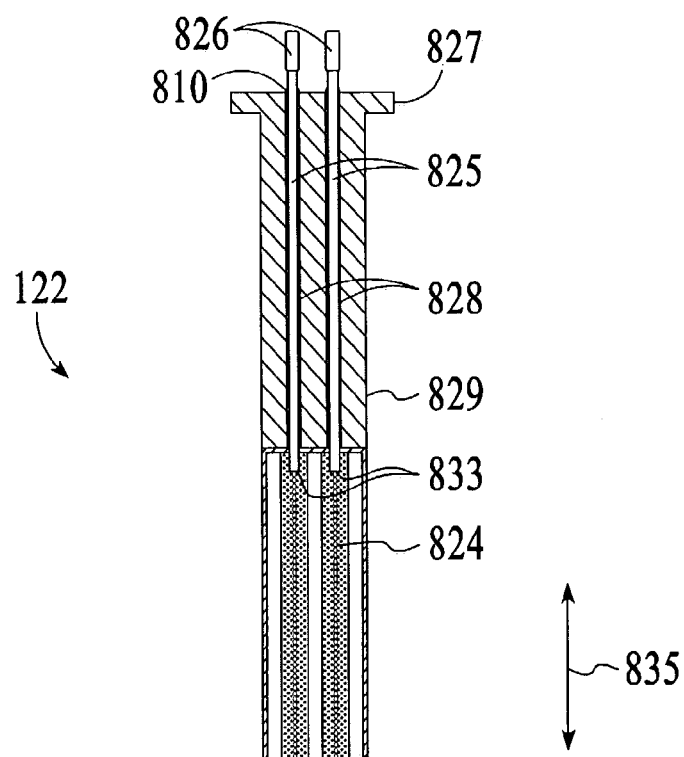
FIG. 8A is a sectional view of a single inner cooking iron.

Referring now to FIG. 8A, a sectional view of a single inner cooking iron. This is one of a plurality of inner cooking irons that are further described in detail in FIG. 9. Inner cooking iron 122 includes a hull 820, and a cap 829. The cap 829 is comprised of a non-heat conductive material, and includes a rim 827 that assists in holding the inner cooking iron 122 in place while in use. Cap 829 has two holes 828 from top to bottom in order to accommodate power supply rods 825. The power supply rods 825 are affixed to cap 829 at 810, and have power supply plugs 826 on a first end. Power supply rods 825 connect to heating element 824 at a second end 833. The heating element 824 is disposed within hull 820. In use, inner cooking iron hull 820 descends into an opening of the cooking block to a depth such that the thickness of the batter from distal end 821 to the bottom of the batter shell is generally equal to or greater than the thickness of the walls of the batter shell.

Figure 8B:
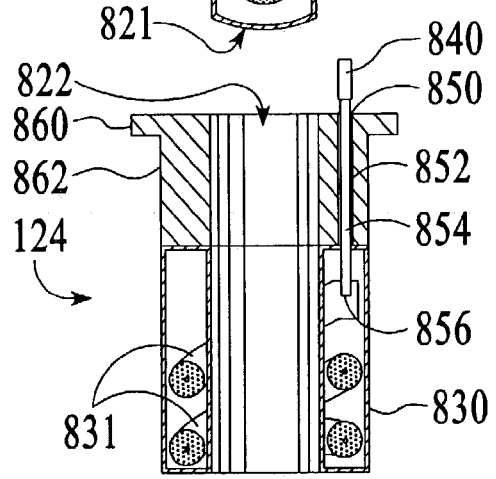
FIG. 8B is a sectional view of a single top cooking iron.

Referring now to FIG. 8B, a sectional view of a single top cooking iron. This is one of a plurality of top cooking irons that are further described in detail in FIG. 10. Top cooking iron 124 includes a hull 830, and a cap 862. The cap 862 is comprised of a non-heat conductive material, and includes a rim 860 that assists in holding the top cooking iron 124 in place while in use. Cap 862 has two holes 852 from top to bottom in order to accommodate power supply rods 854. The power supply rods 854 are affixed to cap 862 at 850, and have power supply plugs 840 on a first end. Power supply rods 854 connect to heating element 831 at the distal end 856. The heating element 831 is disposed within hull 830. In use, the hull 820 of FIG. 8A is slidably positioned 835 within aperture 822 of top cooking iron 124. As top cooking iron 124 and inner cooking iron 122 descend into an opening that has been filled with an aqueous batter, inner cooking iron 122 comes to a stop at a predesignated position, while top cooking iron 124 comes to rest upon the top of the batter. The inner cooking iron 122 remains stationary, while the top cooking iron 124 remains on top of the batter, and is pushed upward as the batter rises. Once the batter shell has been cooked, the top cooking iron 124 remains stationary, while the inner cooking iron 122 ascends from the cooked batter shell. When the distal end 821 of the inner cooking iron hub is completely removed from the cooked batter shell, both the top cooking iron and the inner cooking iron ascend to their start position.

FIG. 9 is an exploded perspective view of the inner cooking iron array. Inner cooking irons 122 are placed into apertures 928. Underside 920 of rim 827 rests upon ledge 929 of sheath 930. When all inner cooking irons are in place, contact plate 950 snaps down upon it in such a manner that power supply plugs 826 slide firmly into slots 924 of lead traces 925. Lead traces 925 supply power from power inlet 926 to all inner cooking irons 122. A thin membrane 960 rests upon the top of contact plate 950 in order to keep any oil or debris from coming into contact with lead traces 925. A cover plate 940 rests upon the top of membrane 960, and the assembly is sandwiched together. The assembly is then slid into a carriage rack including a power outlet that receives inlet 926.

Figure 10:
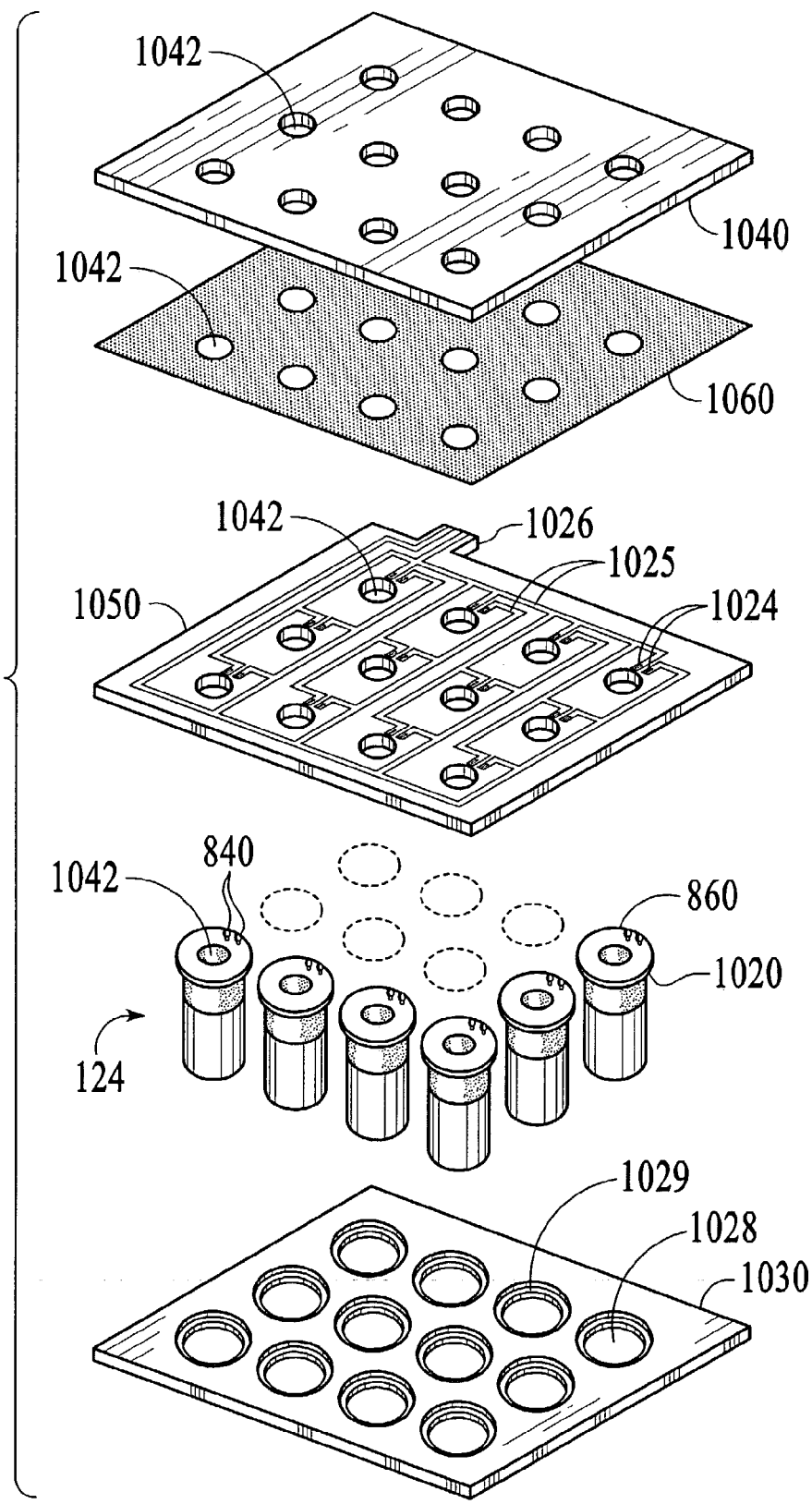
FIG. 10 is a perspective view of the top cooking iron array.

FIG. 10 is a perspective view of the top cooking iron array. Top cooking irons 124 are placed into apertures 1028. Underside 1020 of rim 860 rests upon ledge 1029 of sheath 1030. When all top cooking irons are in place, contact plate 1050 snaps down on it in such a manner that connections 840 slide firmly into slots 1024 of lead traces 1025. Lead traces 1025 supply power from inlet 1026 to all top cooking irons 124. A thin membrane 1060 rests upon the top of contact plate 1050 in order to keep any oil or debris from coming into contact with traces 1025. A cover plate 1040 rests upon the top of membrane 1060, and the assembly is sandwiched together. The cover plate 1040, membrane 1060, contact plate 1050, and top cooking irons 124 include apertures 1042 that allow for the passage of inner cooking iron hub and cap through their entirety. The assembly is then slid into a carriage rack including a power outlet that receives inlet 1026. The temperature of all cooking apparatus are fully adjustable. It is understood that the temperature of the inner and top irons is generally greater than that of the cooking openings block and the bottom cooking irons because the batter shell remains here longer.

FIG. 11A is a sectional view of a dispensing canister filled with a food filling 1170. FIG. 11B is a sectional view of a dispensing canister of a food filling 1170 almost empty. The mechanics of this dispensing device work in much the same way as the batter extrusion apparatus except for that the spring 1130 pushes plunger 1140 only straight down from within canister 1150. Canister may be filled with a food filling at the restaurant, or may be pre-packed at a food preparation facility. The canister is different enough from the batter hopper that it would be unlikely for a person to mistake the two, and attempt to fill the canister with batter.

Figure 11C:
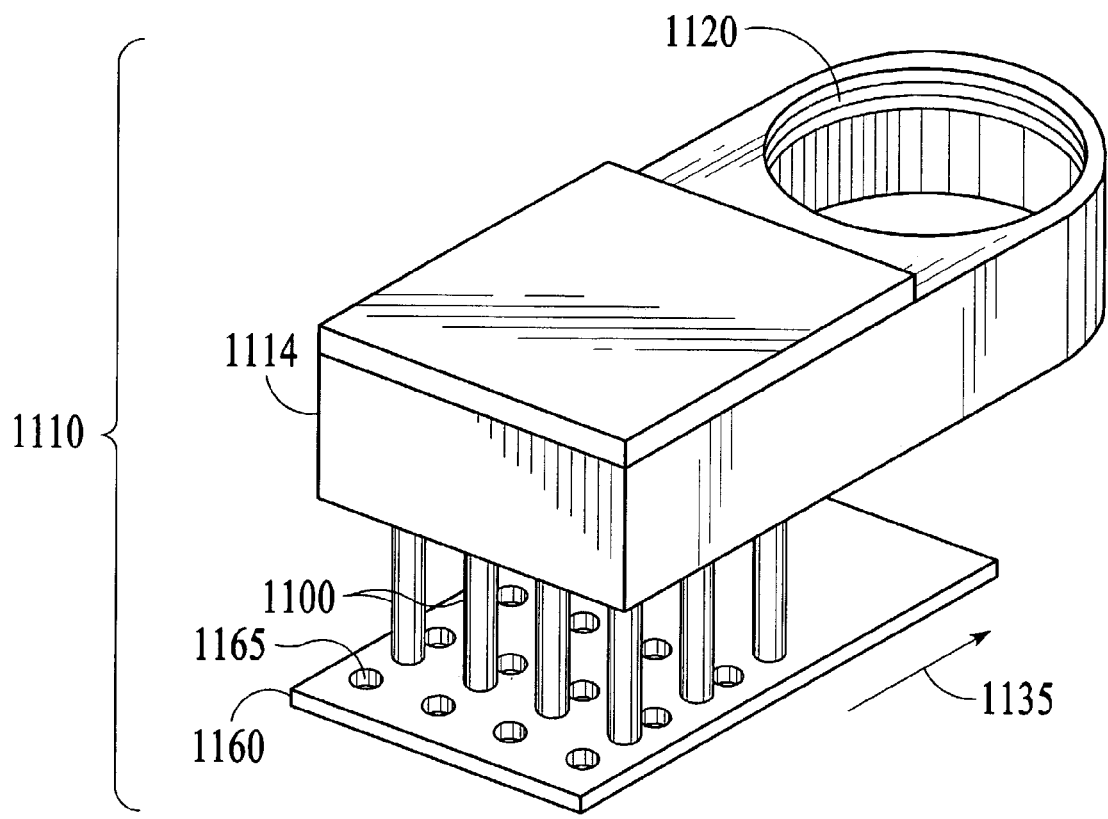
FIG. 11C–D are perspective views of the reservoir for a food filling.
Figure 11D:
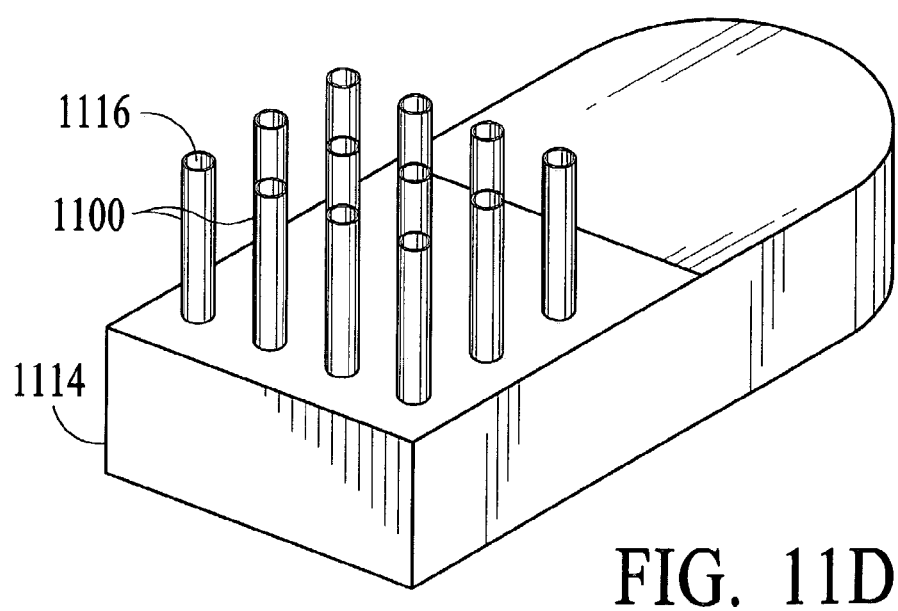

FIGS. 11C–D are perspective views of the food filling apparatus 1110. Dispensing canister 1150 is removably affixed to receptacle 1120 of food filling apparatus 1110. When in the start position, sliding valve plate 1160 is closed, and allows no filling to escape through bushings 1100. In use, the sliding valve plate 1160 moves in the direction 1135, thereby aligning apertures 1165 with bushings 1100. The filling reservoir 1114 and entire filling apparatus descend before extrusion of filling through bushings 1100 so that the distal end 1116 of bushings 1100 protrudes into the void of the cooked batter shell, while sliding valve plate 1160 remains stationary. As the food filling is extruded through bushing 1100 into the void of the cooked batter shell, reservoir 1114 ascends simultaneously, causing the void in the batter shell to be filled evenly and without splattering or spilling off to the side of the batter shell walls. Once food filling has been extruded into the void of the cooked batter shell, and bushings 1100 have returned to the starting position, valve plate 1160 slides back to cover the apertures 1116 of bushings 1100. Cooking openings block 620 now proceeds to the packaging station.

Figure 12A:
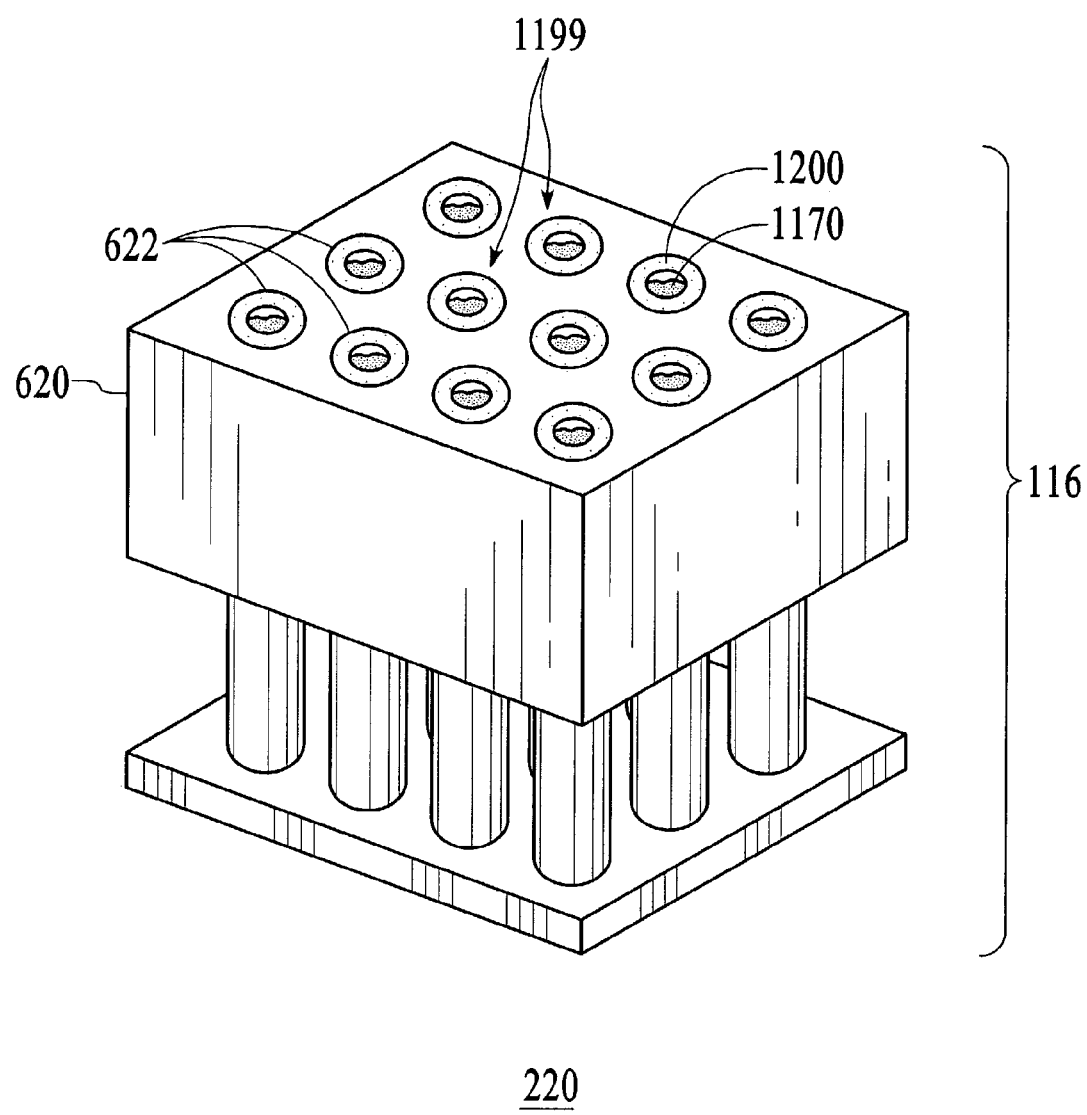
Figure 12D:
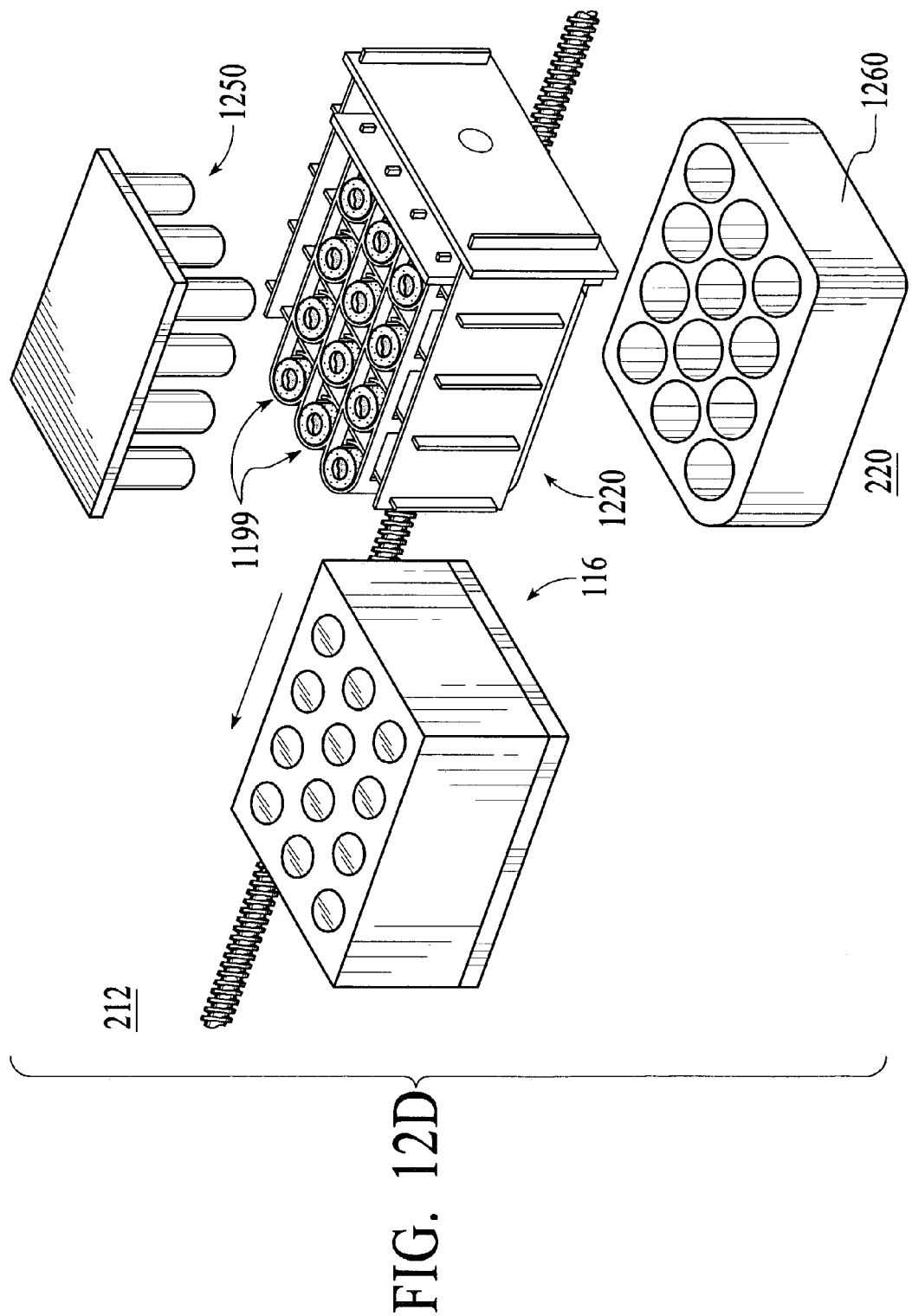

Referring now to FIGS. 12A–E, which illustrate a matrix for cooking a plurality of hand held food products 1199 including a cooked batter shell 1200 and a food filling 1170 within cooking openings 622 of cooking openings block 620. With the hand held food product 1190 fully cooked, filled, and ready for packaging, the matrix 116 has been transported to the packaging station 220. FIG. 12B shows the extrusion pistons 642 of extrusion piston assembly 640 pushing food product 1199 from cooking openings 622. Clamp 1220 is shown here in the open position and ready to receive food product 1199. In use, the clamp 1220 would be just slightly above the top 621 of cooking openings block 620. FIG. 12C better illustrates this position. Once the food product 1199 has been extruded from cooking openings block 620, clamp 1220 clamps onto the cooked batter shells 1200. FIGS. 12D–E show the food product 1199 being held by clamp 1220 as cooking block assembly 116 is transported transversely to the cleaning and oiling station 212. Packaging carton 1260 ascends to meet clamp 1220. Packaging carton 1260 ascends to a location that is just beneath the clamp 1220. When packaging carton 1260 is in place beneath clamp 1220, clamp 1220 releases, and release actuator 1250 gently presses upon the tops of the shells, helping them become situated within the packaging carton 1260. Packaging carton 1260, filled with food product 1199, then descends to its start position, and is pushed onto a rack or tray. In this position, the restauranteur may either place a top cover on the carton, flip an attached lid over the carton, or serve it directly from the carton. Another packaging carton 1260 is pushed into the starting position in order to receive the next batch of food product.

Figure 13A:
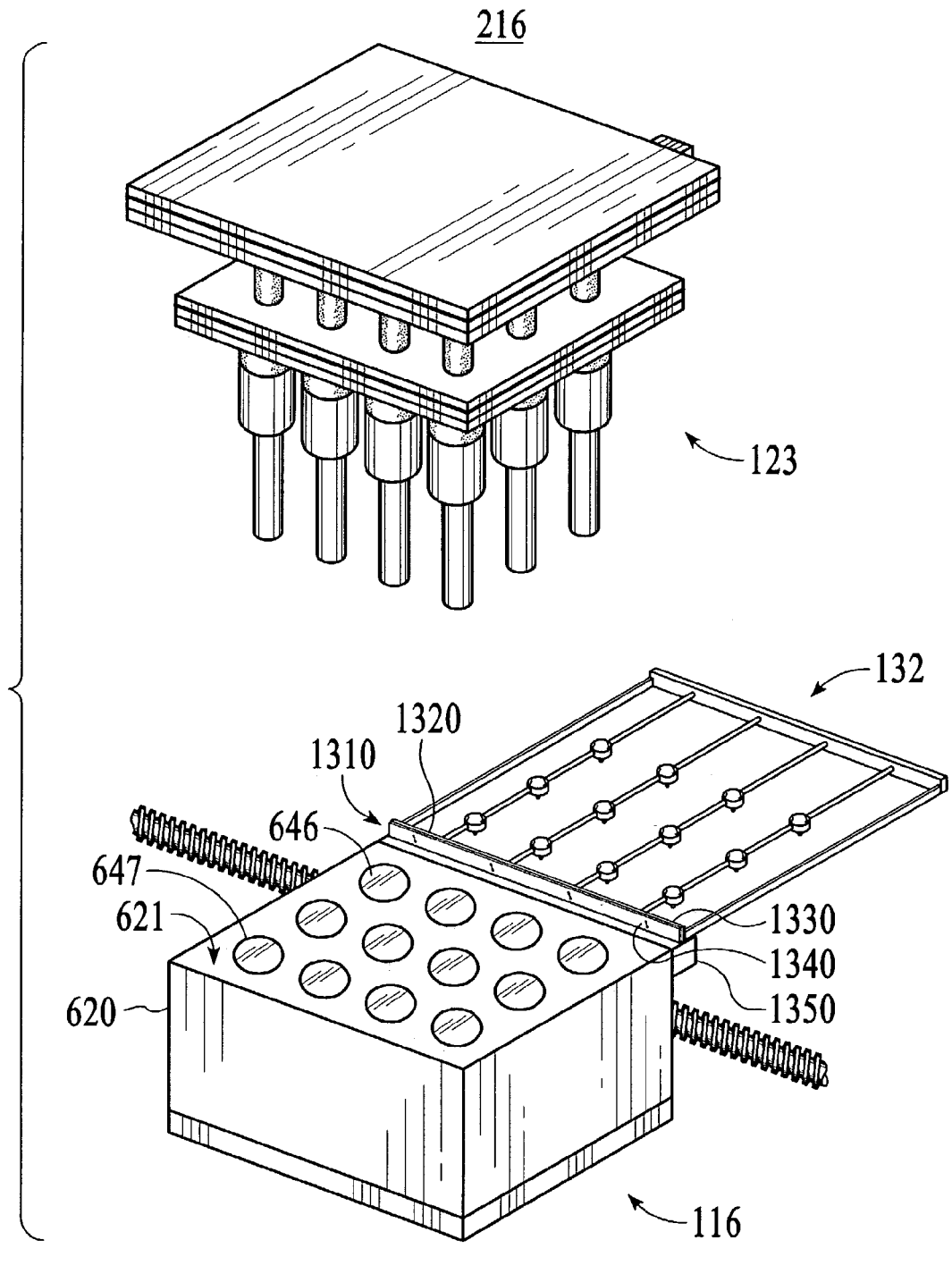
FIGS. 13A–E are perspective views of a cleaning appliance of a matrix for cooking a plurality of batter shells.
Figure 13B:
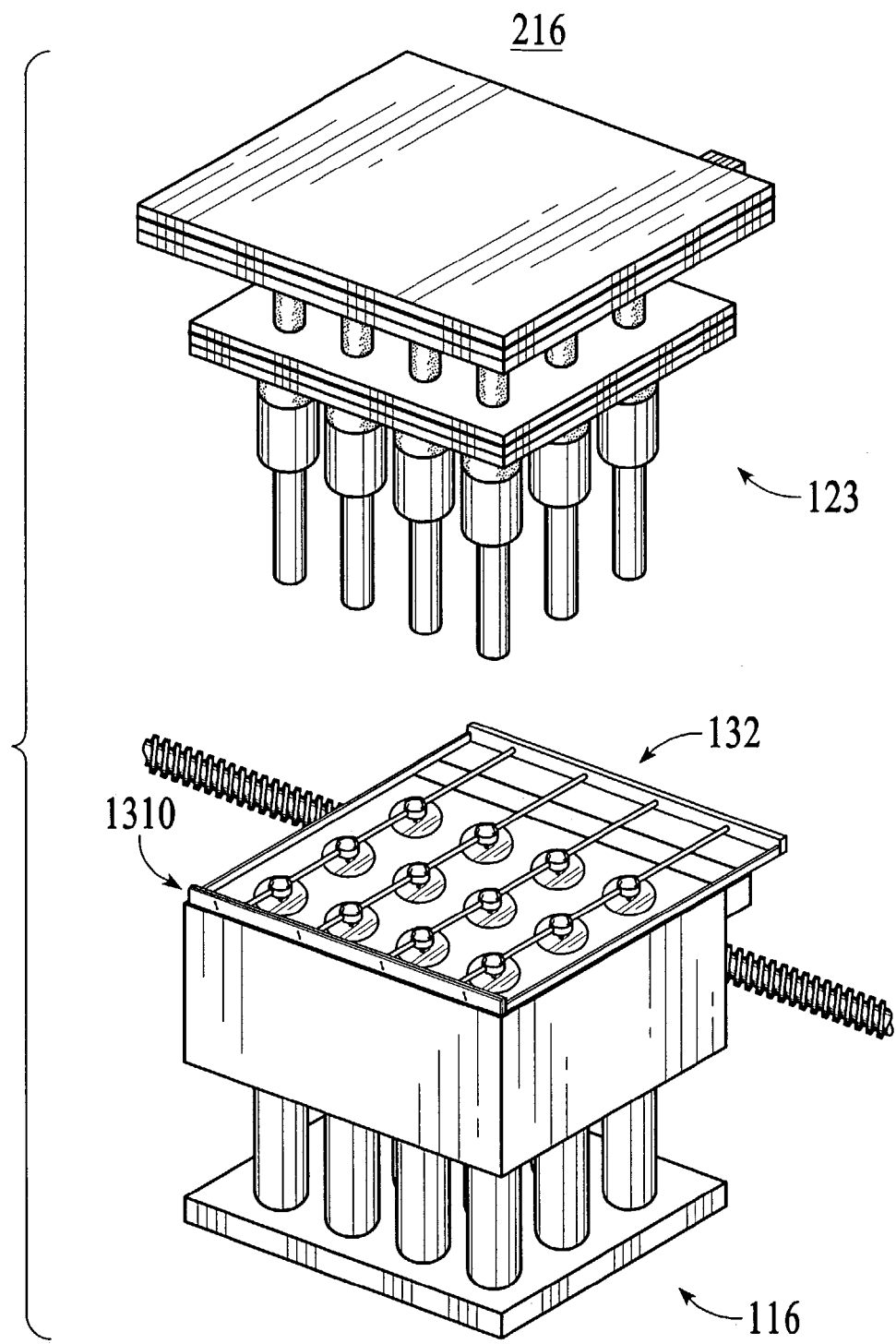
Figure 13C:
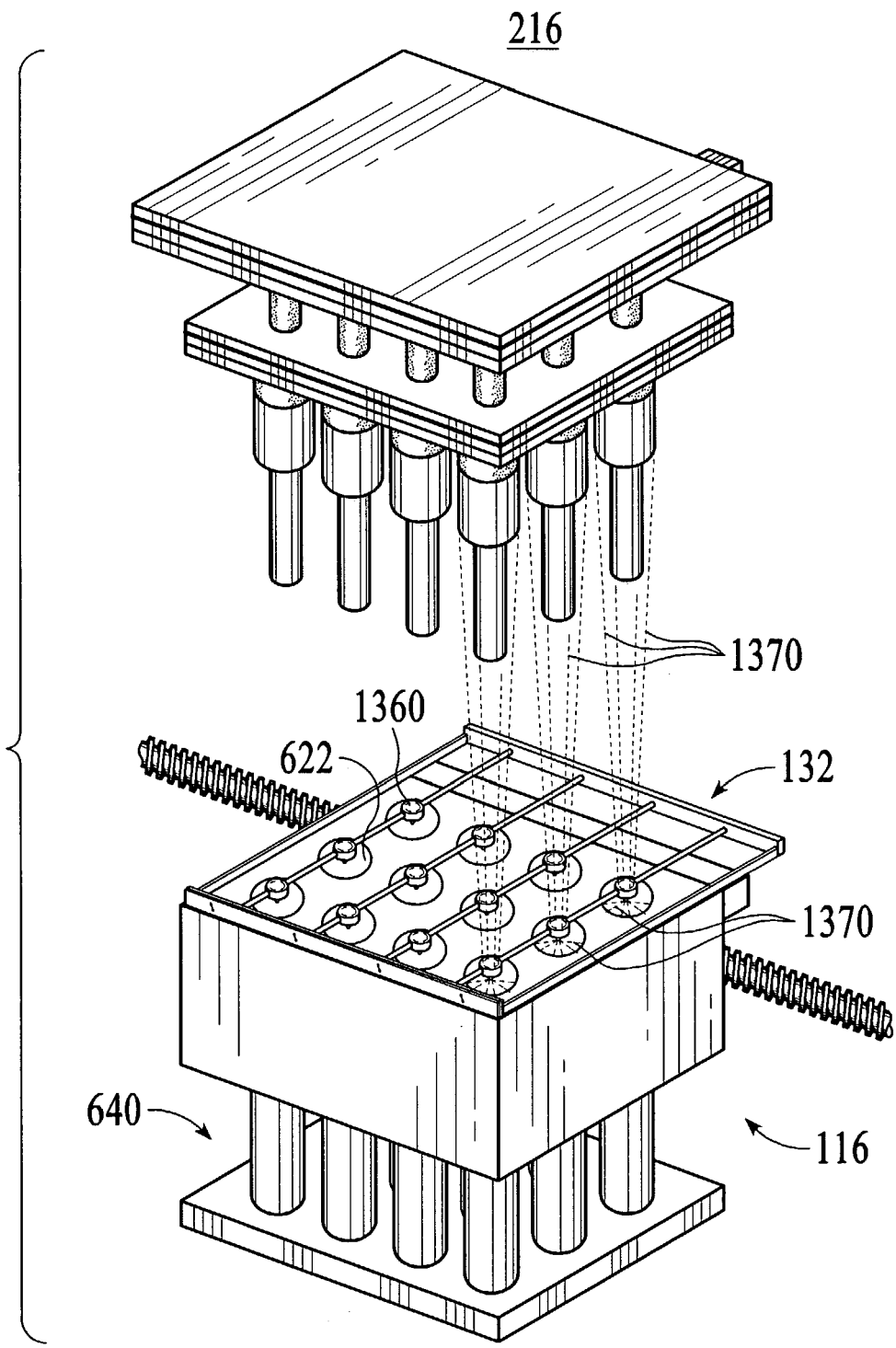
Figure 13D:
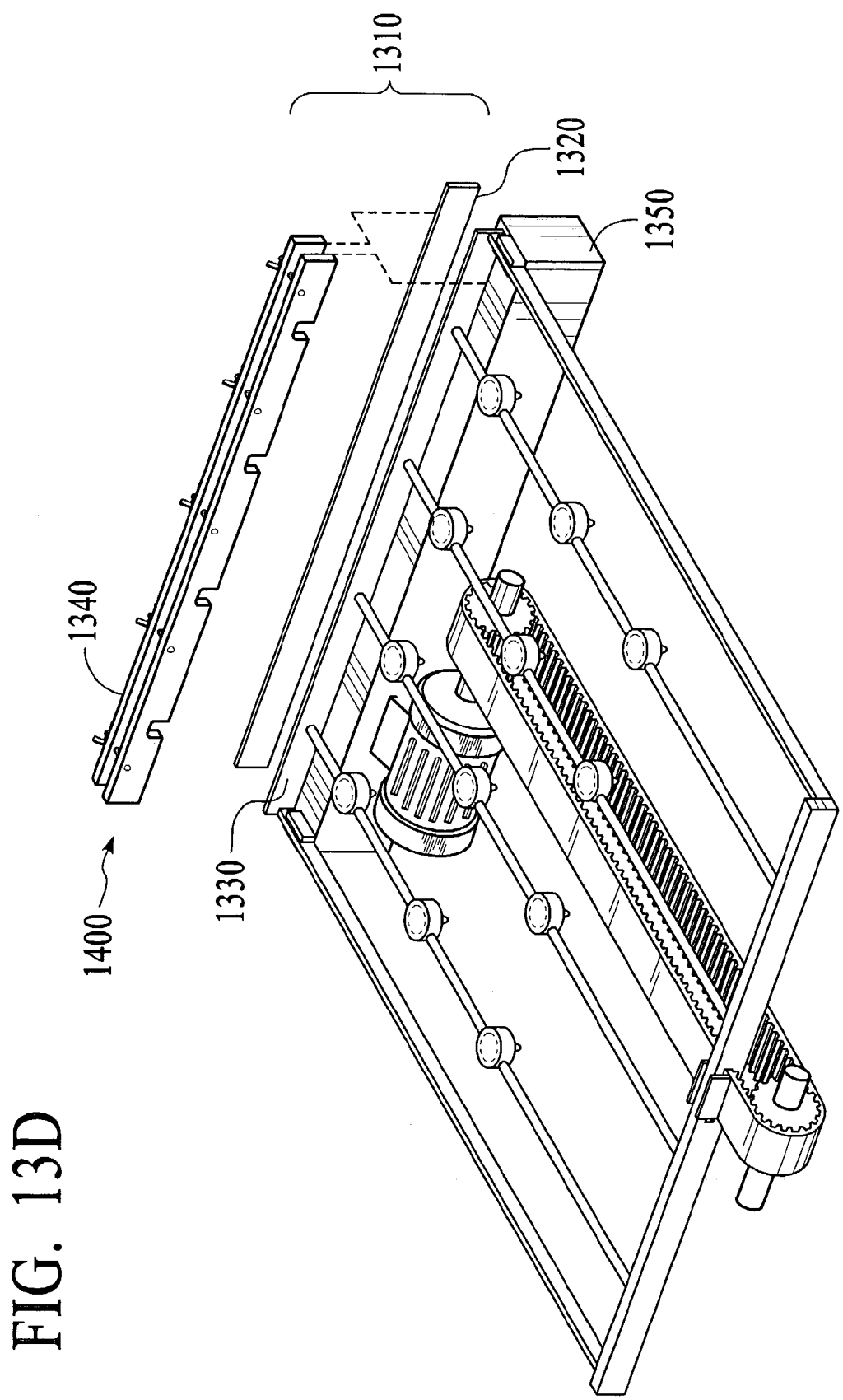
Figure 13E:
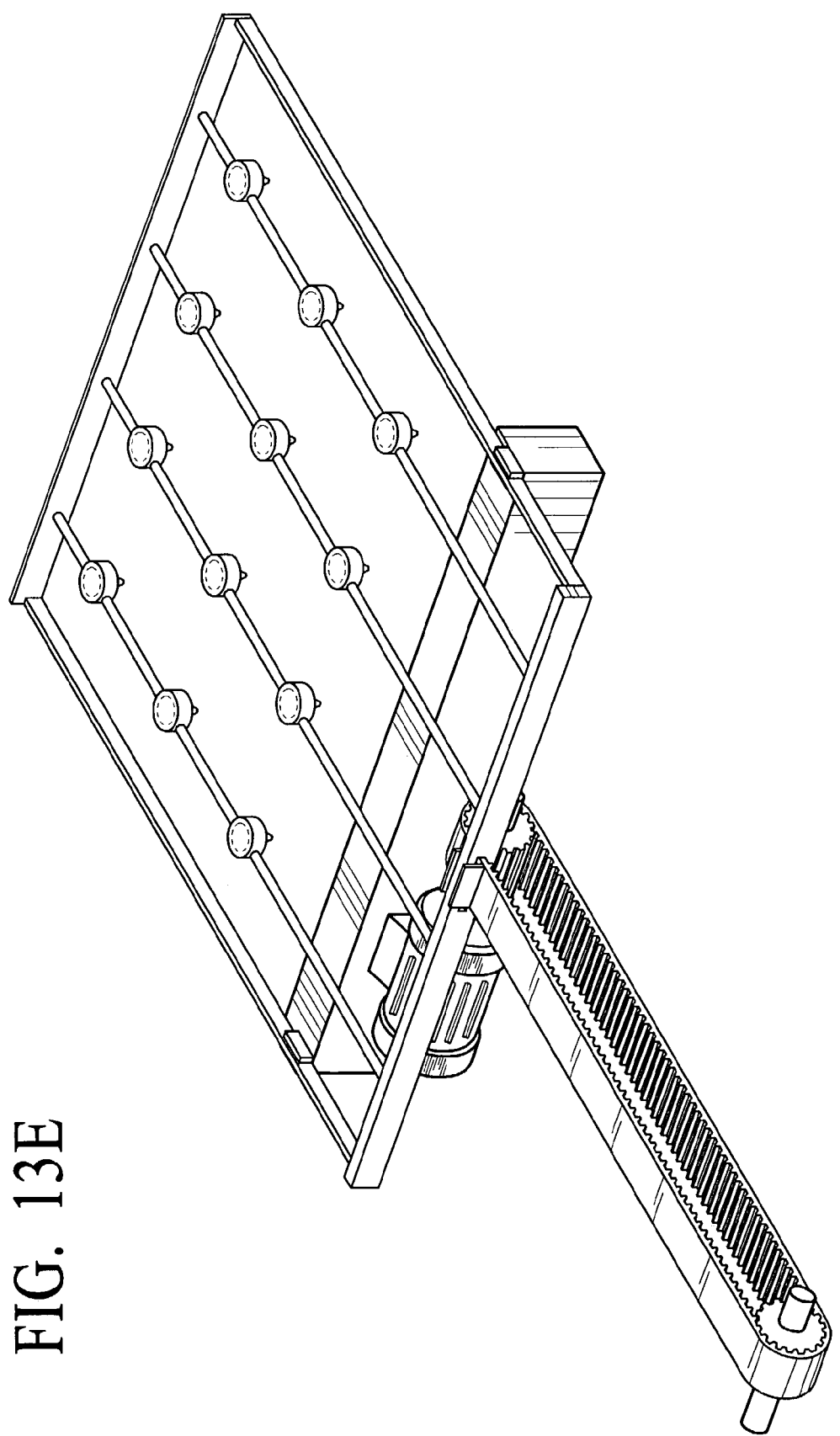

Referring now to FIGS. 13A–E, a matrix for cooking a plurality of batter shells 116 is located at the cleaning and oiling station 212. This is also the cooking iron station 216, and includes cooking iron matrix 123. After extruding the completed R-T-E food product at the packaging station, the bottom cooking irons 647 are at top-dead-center and remain there during the cleaning process. FIGS. 13A and 13D show cleaning appliance 132 in the start position, and cleaning assembly 1310 rests upon block 1350. Cleaning assembly 1310 includes a scraper 1320 comprised of a high temperature resistant ABS material and is sandwiched between two rigid plates. The front plate 1340 is a part of clamp 1400, and the back plate 1330 is part of cleaning assembly 1310. It is the cleaning scraper 1320 that is in direct contact with block 1350, and subsequently comes in contact with surfaces 621 and 646. The scraping action causes minimal wear, and the scraper 1320 may need to be adjusted occasionally. This is accomplished by loosening clamp 1400, applying a light pressure upon the top of scraper 1320, and tightening clamp 1400. Replacement of scraper 1320 is accomplished in a similar manner.

The cleaning appliance 132 is transported transversely across the top of cooking openings block 620 such that cleaning scraper 1320 scrapes along the surface 621 of cooking openings block 620, and the top surface 646 of bottom cooking irons 647, thereby removing any debris from the surfaces. This is the end of the cycle.

As seen in FIG. 13C, as the apparatus of the present invention begins a new cycle, extrusion piston assembly 640 now descends to the start position, and a scorch-resistant oil 1370 is sprayed from oil sprayers 1360. The oil spray lubricates the bottom cooking irons, the walls of the cooking openings 622, the inner cooking iron hubs 820, and the top cooking iron hubs 830. Cleaning appliance 132 then returns to the start position, and the matrix 116 is moved to the batter fill station.

At the end of a day's operation, a cleaning cycle is initiated for the machine. Soapy water is introduced into the food product hopper, and the pistons and cooking irons are agitated up and down, thereby accomplishing a self-cleaning cycle.

FIRST ALTERNATE EMBODIMENT

Figure 14:
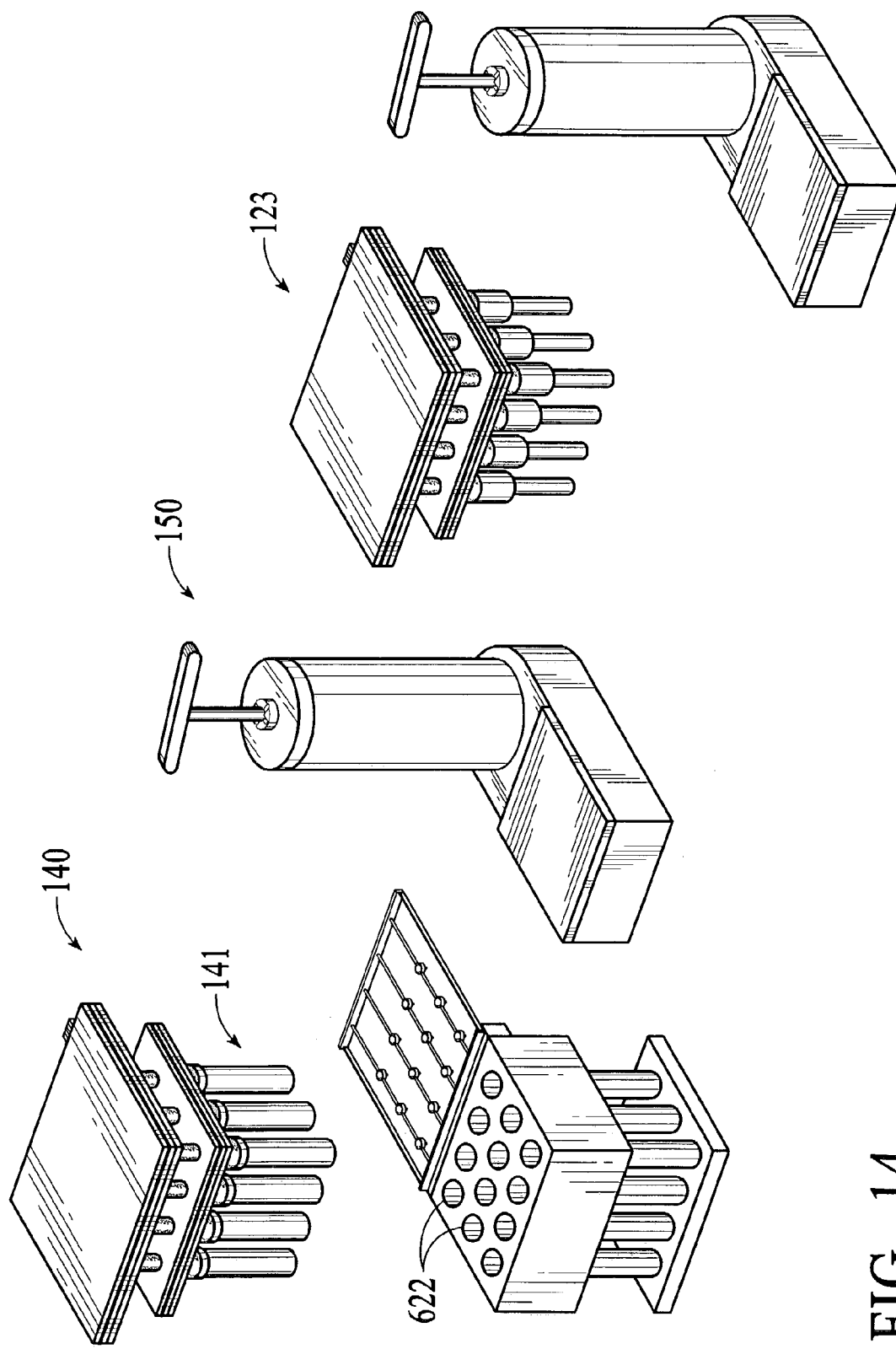
FIG. 14 shows an alternate embodiment of the present invention.

A first alternate embodiment is shown in FIG. 14. In this embodiment, a third food item is added to the product. This requires the addition of a second cooking matrix 140 and a third food filling station 150. The second cooking matrix 140 is constructed in the same manner as the cooking matrix 123. The only difference is that the second cooking iron array 141 would have diameters such that the iron array 141 would fill more of the interior of the cooking openings 622. This enables the user to use the second cooking matrix 140 to form the outer shell of the food product. The alternate embodiment outer shell would be thinner than that of the preferred embodiment if the overall diameter of the end product is the same. A wider overall diameter would allow the thickness of the outer shell to remain the same as in the preferred embodiment.

Following the cooking of the outer shell, a third food product from the third food filling station 150 is inserted, and cooks that product into a second layer using the cooking matrix 123. The central cavity of the product thus formed is then filled with a food filling as in the preferred embodiment.

It is envisioned that the three stage process of the first alternate embodiment could be used for a product such as a food item with a cooked potato outer shell and a second layer of cooked egg lining the outer potato shell. The cooked egg inner shell would then be filled with sausage. The sausage would be pushed through a cooking tube with holes therein to serve as a grease release means.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An automated process to form a food product comprising the following steps:
 a) forming a cooking matrix that includes a plurality of cooking openings to receive a first food product, a plurality of first heating elements that are inserted into said first food product, and a plurality of second heating elements that are applied to a surface of said first food product;
 b) injecting said first food product into each of said plurality of cooking openings of said cooking matrix;
 c) inserting said first heating element into said first food product within each of said cooking openings of said cooking matrix;
 d) applying said second heating element to a top surface of said first food product within each of said cooking openings of said cooking matrix;
 e) applying heat to a circumference and to bottom surfaces of said cooking openings of said cooking matrix, and applying heat to a circumference and to bottom surfaces of said first heating elements, and applying heat to bottom surfaces of said second heating elements,
 f) removing said first heating element from each of said cooking openings containing said first food product, then removing said second heating element, so that said first food product forms a plurality of cooked shells;
 g) injecting a second food product into an opening of selected ones of said shells so as to form an end product, second food product being pre-cooked or being edible without cooking; and
 h) packaging said end product into desired packaging.

2. The process of claim 1 wherein:
a cleaning station is included to clean said cooking matrix following the packaging step in each cooking cycle prior to inserting said first food product for a successive cooking cycle.

3. The process of claim 1 wherein:
said cooking matrix includes a means to apply heat to a center of said cooking openings.

4. The process of claim 1 wherein:
said cooking matrix includes a means to apply heat to a top side of said cooking openings.

5. The process of claim 1 wherein:
said cooking openings are cylindrical, and are arranged in rows.

6. The process of claim 1 wherein:
said cooking matrix comprises an inner cooking iron array comprising a plurality of cylindrical cooking irons formed by said first heating elements disposed in said cooking openings of said cooking matrix.

7. The process of claim 1 wherein:
said cooking openings have a cross section in the form of a polygon.

8. The process of claim 1 wherein:
said cooking openings have a cross section in the form of an alphanumeric character.

9. The process of claim 1 wherein:
said cooking openings have a cross section in the form of a trademark of a user.

10. The process of claim 6 wherein:
said inner cooking irons have a cross section in the form of a geometric configuration.

* * * * *